(12) United States Patent
Ito et al.

(10) Patent No.: US 7,890,112 B2
(45) Date of Patent: Feb. 15, 2011

(54) RADIO DEVICE HAVING FEWER ROUTE DISCONNECTIONS AND SWITCHINGS BY USING CONTROL PACKETS TO MAINTAIN RADIO LINKS

(75) Inventors: Tetsuya Ito, Tokyo (JP); Jun Hasegawa, Kyoto (JP); Satoko Itaya, Kyoto (JP); Akira Matsumoto, Tokyo (JP); Hiroyuki Iizuka, Tokyo (JP); Yuichiro Ezure, Tokyo (JP); Akio Hasegawa, Kyoto (JP); Peter Davis, Kyoto (JP); Naoto Kadowaki, Kyoto (JP); Sadao Obana, Kyoto (JP)

(73) Assignees: NEC Communication Systems, Ltd., Tokyo (JP); Advanced Telecommunications Research Institute International, Kyoto (JP)

( * ) Notice: Subject to any disclaimer, the term of this patent is extended or adjusted under 35 U.S.C. 154(b) by 253 days.

(21) Appl. No.: 11/896,531

(22) Filed: Sep. 4, 2007

(65) Prior Publication Data
US 2008/0056196 A1    Mar. 6, 2008

(30) Foreign Application Priority Data
Sep. 4, 2006  (JP) .............................. 2006-239126

(51) Int. Cl.
*H04W 40/00* (2009.01)
(52) U.S. Cl. .................... 455/445; 455/450; 455/452.2; 455/428; 455/41.2; 370/338; 370/328; 370/310
(58) Field of Classification Search ................. 455/445, 455/450, 452.2, 428, 41.2; 370/338, 328, 370/310
See application file for complete search history.

(56) References Cited

U.S. PATENT DOCUMENTS 6,507,567 B1 *  1/2003  Willars ........................ 370/321
7,088,698 B1 *  8/2006  Harsch ........................ 370/338

(Continued)

FOREIGN PATENT DOCUMENTS

JP          9-55764       2/1997

(Continued)

OTHER PUBLICATIONS

Japanese Office Action, with English translation, issued in Japanese Patent Application No. JP 2006-239126, mailed Jun. 24, 2008.

(Continued)

*Primary Examiner*—Huy Phan
*Assistant Examiner*—Vladimir Magloire
(74) *Attorney, Agent, or Firm*—McDermott Will & Emery LLP

(57) ABSTRACT

The route maintenance unit outputs a period setting request to the period setting unit when the communication unit normally receives a Hello packet for the first time. The period setting unit sets a link connection confirmation period in response to the period setting request and outputs the set period to the route maintenance unit. The route maintenance unit maintains a radio link between the radio device in which the route maintenance unit is provided and an adjacent device upon receiving a data packet other than a Hello packet from the adjacent radio device even if a Hello packet is not received in the link connection confirmation period. Consequently, route disconnection or switching occurs less often.

11 Claims, 17 Drawing Sheets

U.S. PATENT DOCUMENTS 7,406,030 B1 * 7/2008 Rijsman ..................... 370/216
2007/0038743 A1 * 2/2007 Hellhake et al. ............ 709/224

FOREIGN PATENT DOCUMENTS

| | | |
|---|---|---|
| JP | 11-41271 | 2/1999 |
| JP | 2005-94375 | 4/2005 |
| JP | 2005-252858 | 9/2005 |
| JP | 2005-260299 | 9/2005 |
| JP | 2007-519317 | 7/2007 |
| JP | 2007-529135 | 10/2007 |
| JP | 2008-506292 | 2/2008 |
| JP | 2008-519531 | 6/2008 |
| WO | WO 2005/057834 A2 | 6/2005 |
| WO | WO 2005/062552 A1 | 7/2005 |
| WO | WO 2006/006117 A1 | 1/2006 |
| WO | WO 2006/052715 A2 | 5/2006 |

OTHER PUBLICATIONS

Perkins, C., "Ad hoc On-Demand Distance Vector (AODV) Routing," RFC3561, Jul. 2003, pp. 21-22, (URL, http://www.ietr.org/rfc/rfc3561.txt).

Japanese Notification of Reasons for Refusal, w/ English translation thereof, issued in Japanese Patent Application No. JP 2006-239126 dated on Sep. 24, 2008.

Gerla, M., et al., "Fisheye State Routing Protocol (FSR) for Ad Hoc Networks" IETF Manet Working Group Internet Draft, Jun. 17, 2002, pp. 1-17, IETF Manet Working Group.

Iizuka, H., et al., "Experimental Comparison of File Transfer Protocols FTP and TFTP in Wireless Multihop Networks", IEICE Technical Report, 2005, pp. 49-52, The Institute of Electronics, Information and Communication Engineers.

* cited by examiner

Fig. 8
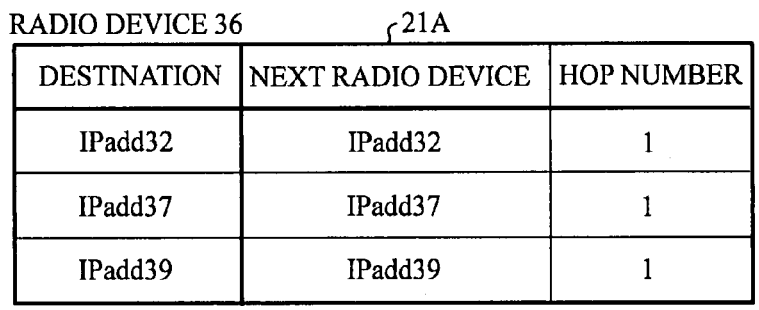
(a)
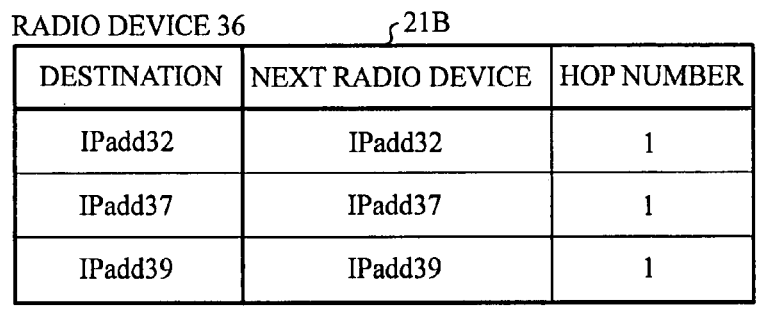
(b)
Fig. 9
```
                    PKT_D1
            ┌─────────────────────────────────────────────────────┐
            │     RADIO LINK 32-36 PRESENT LOW QUALITY (BEING RECOVERED) │
            │ PHD RADIO LINK 37-36 PRESENT HIGH QUALITY           │
            │     RADIO LINK 39-36 PRESENT HIGH QUALITY           │
            └─────────────────────────────────────────────────────┘
```

RADIO DEVICE 32         21C

| DESTINATION | NEXT RADIO DEVICE | HOP NUMBER |
|---|---|---|
| IPadd36 | IPadd36 | 1 |
| IPadd37 | IPadd36 | 2 |
| IPadd39 | IPadd36 | 2 |

(a)

RADIO DEVICE 32         21D

| DESTINATION | NEXT RADIO DEVICE | HOP NUMBER |
|---|---|---|
| IPadd36 | IPadd36 | 1 |
| IPadd37 | IPadd36 | 2 |
| IPadd39 | IPadd36 | 2 |

(b)

RADIO DEVICE 37      ⌐21E

| DESTINATION | NEXT RADIO DEVICE | HOP NUMBER |
|---|---|---|
| IPadd32 | IPadd36 | 2 |
| IPadd36 | IPadd36 | 1 |
| IPadd39 | IPadd36 | 2 |

(a)

RADIO DEVICE 37      ⌐21F

| DESTINATION | NEXT RADIO DEVICE | HOP NUMBER |
|---|---|---|
| IPadd32 | IPadd36 | 2 |
| IPadd36 | IPadd36 | 1 |
| IPadd39 | IPadd36 | 2 |

(b)

RADIO DEVICE 39　　　21G

| DESTINATION | NEXT RADIO DEVICE | HOP NUMBER |
|---|---|---|
| IPadd32 | IPadd36 | 2 |
| IPadd36 | IPadd36 | 1 |
| IPadd37 | IPadd36 | 2 |

(a)

RADIO DEVICE 39　　　21H

| DESTINATION | NEXT RADIO DEVICE | HOP NUMBER |
|---|---|---|
| IPadd32 | IPadd36 | 2 |
| IPadd36 | IPadd36 | 1 |
| IPadd37 | IPadd36 | 2 |

|     | PKT_D2 |
|-----|--------|
| PHD | RADIO LINK 36-39 PRESENT HIGH QUALITY<br>RADIO LINK 39-42 PRESENT LOW QUALITY (BEING RECOVERED)<br>RADIO LINK 39-41 PRESENT HIGH QUALITY |

Fig. 18

RADIO DEVICE 41    21J

| DESTINATION | NEXT RADIO DEVICE | HOP NUMBER |
|---|---|---|
| IPadd32 | IPadd39 | 3 |
| IPadd32 | IPadd37 | 3 |
| IPadd31 | IPadd37 | 2 |
| IPadd36 | IPadd39 | 2 |
| IPadd37 | IPadd37 | 1 |
| IPadd39 | IPadd39 | 1 |

RADIO DEVICE HAVING FEWER ROUTE DISCONNECTIONS AND SWITCHINGS BY USING CONTROL PACKETS TO MAINTAIN RADIO LINKS

BACKGROUND OF THE INVENTION

1. Field of the Invention

The invention relates to a radio device and a radio communication network including the device.

2. Description of the Related Art

An ad hoc network is constructed autonomously and instantaneously by mutual communication between a plurality of radio devices. In the ad hoc network, if two communicating radio devices are not present in each other's communication areas, a radio device positioned between the two radio devices functions as a router to relay data packets, and therefore a wide range multi-hop network can be formed.

Dynamic routing protocols that support the multi-hop communication include table-driven protocols and on-demand protocols. Table-driven protocols allow control information related to routes to be regularly exchanged, so that a routing table is set in advance, and known examples of the protocols include FSR (Fish-eye State Routing), OLSR (Optimized Link State Routing), and TBRPF (Topology Dissemination Based on Reverse-Path Forwarding).

On-demand protocols allow a route to a destination to be made only when a demand for data transmission is issued, and known examples of the protocols include DSR (Dynamic Source Routing) and AODV (Ad Hoc On-Demand Distance Vector Routing).

In a conventional ad hoc network, a routing protocol has been proposed, according to which if a Hello packet transmitted from the same terminal is dropped three times in a row, the link with the terminal is disconnected (M. Gerla, X. Hong, and G. Pei, "Fisheye State routing protocol (FSR) for ad hoc networks", IETF Draft, 2002).

BRIEF SUMMARY OF THE INVENTION

However, when a Hello packet from the same terminal is dropped three times in a row and the link with the terminal is disconnected in response, the route is disconnected or switched and application data packets are lost (Iizuka et al., "Experimental Comparison of File Transfer Protocols FTP and TFTP in Wireless Multihop Networks", IEICE Technical Report, NS 2005-36, May. 2005, pp. 49-52).

More specifically, a control packet for a routing protocol to find and maintain a link with an adjacent terminal is transmitted by a broadcast frame. The broadcast frame does not have a means to confirm transmission and is more easily lost by frame collision than a unicast frame. In a radio ad hoc network, frames can collide because of the existence of a hidden terminal, and so a control packet can be lost despite its low use ratio in a radio band. Consequently, the route is disconnected or switched, so that application data packets are lost.

Therefore, the present invention is directed to a solution to the disadvantage, and it is an-object of the invention to provide a radio device that reduces the occurrence of route disconnection or switching.

Another object of the invention is to provide a radio communication network including such radio devices that hardly cause route disconnection or switch.

A radio device according to the invention is for use in an autonomously established radio communication network and includes communication means, period setting means, and route maintenance means. The communication means carries out radio communication with radio devices adjacent to the radio device. The period setting means sets a route confirmation period used to confirm a radio link between the radio device and each of the adjacent radio devices. The route maintenance means maintains the radio link when the communication means transmits and/or receives a packet to/from the adjacent radio device in the route confirmation period.

Preferably, when the communication means does not transmit and/or receive a control packet used to maintain/disconnect the radio link to/from the adjacent radio device in the route confirmation period, the route maintenance means maintains the radio link upon transmitting and/or receiving a packet other than the control packet in the route confirmation period.

Preferably, the route maintenance means maintains the radio link when the quality of radio communication with the adjacent radio device satisfies a standard quality requirement.

Preferably, when there are a plurality of radio links between the radio device and a plurality of adjacent radio devices, and at least a standard amount of radio communication is carried out using a first radio link as one of the plurality of radio links, the route maintenance means maintains a second radio link different from the first radio link even if a packet is not received through the second radio link in the route confirmation period.

Preferably, the route maintenance means maintains the second radio link when the channel used in the first radio link and the channel used in the second radio link affect each other's radio communication qualities.

Preferably, the route maintenance means determines the degree of effect on the radio communication qualities based on the positional relation between the adjacent radio device in the first radio link and the adjacent radio device in the second radio link and maintains the second radio link when there is mutual effect.

Preferably, the route maintenance means maintains the second radio link when the number of times that the second radio link was maintained is not more than a reference number and disconnects the second radio link when the number of times exceeds the reference number.

Preferably, the radio device further includes information maintenance means. The information maintenance means maintains information related to the maintained radio link when the radio link is maintained.

Preferably, the related information includes at least one kind of information related to the adjacent radio devices, information related to radio devices adjacent to the adjacent radio devices, and information related to the arrangement state of radio devices in the radio communication network.

Preferably, when the radio link is maintained, the communication unit transmits to the adjacent radio device a dedicated packet including an advertisement that displays that the maintained link is to be recovered.

Preferably, the communication means carries out radio communication with the adjacent radio devices from which it has received the dedicated packet with reduced amount of radio communication.

Preferably, the radio device further includes route, determining means. The route determining means determines a route, used to transmit the packet to the destination, via a radio device different from the radio device that has transmitted the dedicated packet when the communication means receives the dedicated packet including an advertisement that displays that the maintained radio link is to be recovered.

A radio communication network according to the invention includes the radio device according to claim 1.

According to the invention, each of the radio devices sets a route confirmation period used to confirm a radio link with an adjacent radio device and maintains the radio link if a packet is transmitted and/or received to/from the adjacent radio device in the set route confirmation period. More specifically, each of the radio devices maintains the radio link if a control packet used to maintain/disconnect a radio link as well as any packet other than the control packet such as an RTS packet, a CTS packet, and an ACK packet is received in the route confirmation period.

Therefore, according to the invention, route disconnection or switching occurs less often. Consequently, application data packets are lost less often.

BRIEF DESCRIPTION OF THE SEVERAL VIEWS OF THE DRAWING

FIG. 8 shows specific examples of a routing table.

FIG. 9 shows an example of a dedicated packet.

FIG. 17 shows another example of the dedicated packet.

FIG. 18 shows another specific example of the routing table.

DETAILED DESCRIPTION OF THE INVENTION

Figure 1:
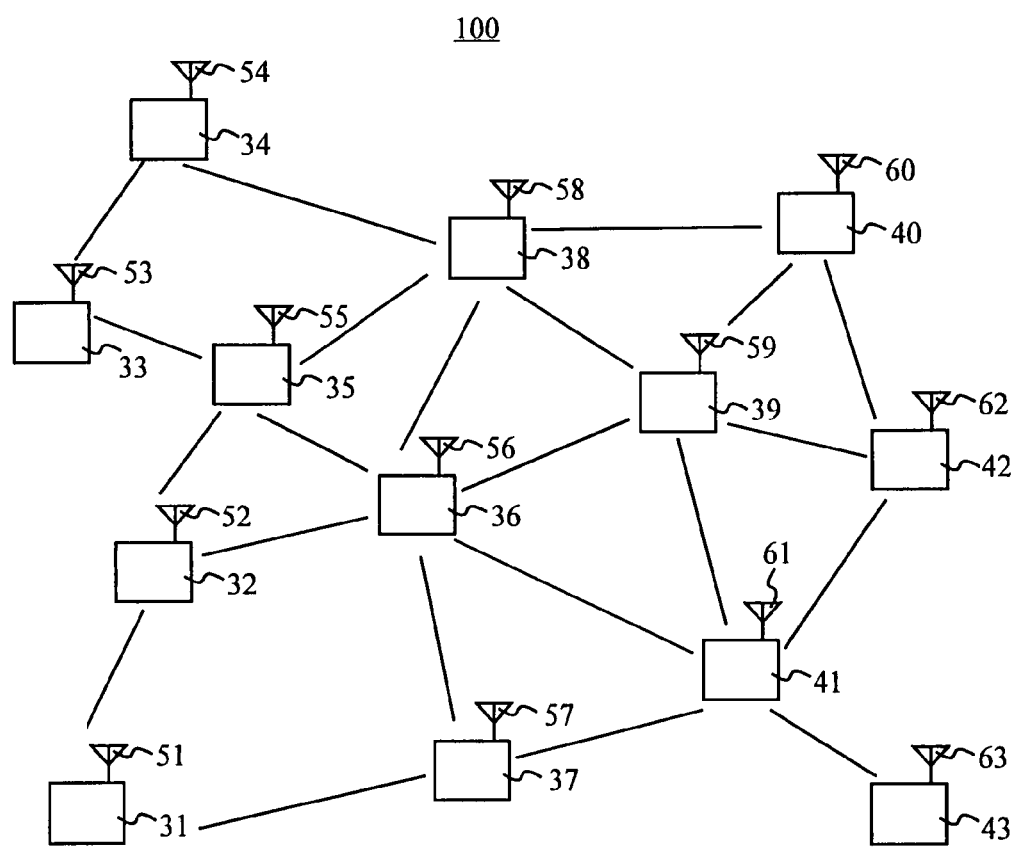
FIG. 1 is a schematic diagram of a radio communication network using radio devices according to an embodiment of the invention.

Embodiments of the invention will be described in detail in conjunction with the accompanying drawings, in which the same or corresponding portions are denoted by the same reference characters, and their description will not be repeated.

FIG. 1 is a schematic diagram of a radio communication network including radio devices according to an embodiment of the invention. The radio communication network 100 includes radio devices 31 to 43. The radio devices 31 to 43 are provided in a radio communication space and autonomously form a network. Antennas 51 to 63 are attached to the radio devices 31 to 43, respectively.

The radio devices 31 to 43 each have at least one radio interface (module) and allocate a channel to be used for radio communication for each of the radio interfaces. The radio devices 31 to 43 each use a selected channel to carry out radio communication along various routes.

When for example the radio device 31 transmits a packet to the radio device 42, the radio devices 32 and 35 to 41 relay and deliver the packet from the radio device 31 to the radio device 42.

In this case, the radio device 31 can carry out radio communication with the radio device 42 through various routes. More specifically, the radio device 31 can carry out radio communication with the radio device 42 through the radio devices 37 and 41, also through the radio devices 32, 36, and 39, and through the radio devices 32, 35, 38, and 40.

The hop number is "3" when the radio communication is carried out through the radio devices 37 and 41, "4" when it is through the radio devices 32, 36, and 39, and "5" when it is through the radio devices 32, 35, 38, and 40.

Therefore, the radio communication is normally carried out in the route from the radio device 31, through the radio device 37, and the radio device 41, to the radio device 42 in which the hop number is "3" that is the smallest hop number.

In the radio communication network 100, the radio devices 31 to 43 each regularly transmit and receive a Hello packet to and from other radio devices and form a radio link for radio communication.

Therefore, in the following paragraphs, a mechanism that reduces the disconnection or switching of a once constructed radio link will be described.

Note that the OLSR protocol is used as an example of a protocol with which a radio link is constructed between a transmission source and a transmission destination. The OLSR protocol is a table-driven type routing protocol according to which routing information is exchanged using Hello messages and TC (Topology Control) messages and a routing table is produced.

Figure 2:
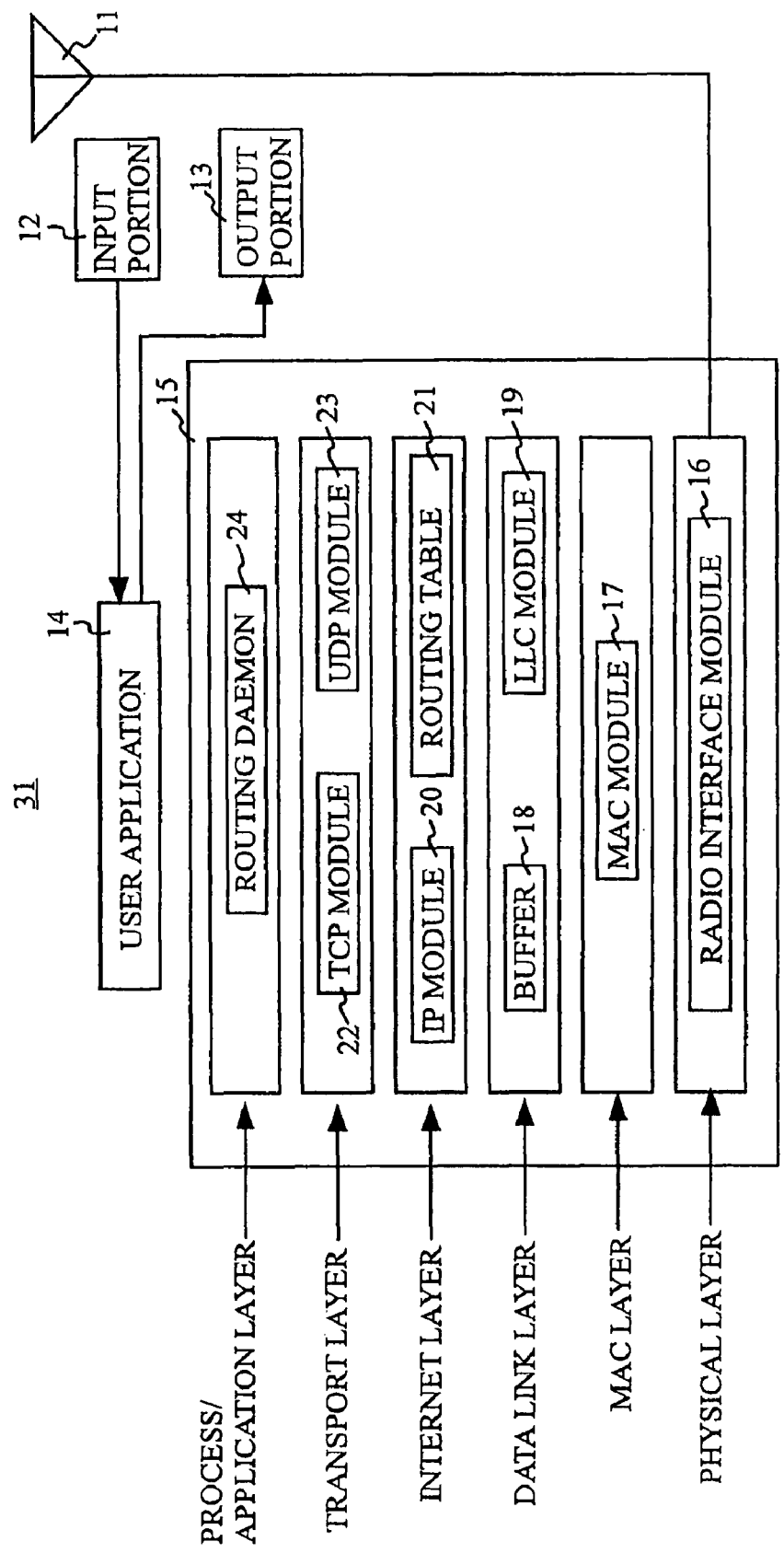
FIG. 2 is a schematic block diagram of the configuration of the radio device shown in FIG. 1.

FIG. 2 is a schematic block diagram of the configuration of the radio device 31 shown in FIG. 1. The radio device 31 includes an antenna 11, an input portion 12, an output portion 13, a user application 14, and a communication control portion 15.

The antenna 11 corresponds to each of the antennas 51 to 63 shown in FIG. 1. The antenna 11 receives data from another radio device through a radio communication space, outputs the received data to the communication control portion 15, and transmits data from the communication control portion 15 to another radio device through the radio communication space.

The input portion 12 accepts a message and the destination of data input by the operator of the radio device 31 and outputs the accepted message and destination to the user application 14. The output portion 13 displays the message according to control by the user application 14.

The user application 14 produces data based on the message and destination from the input portion 12 and outputs the data to the communication control portion 15.

The communication control portion 15 includes a plurality of modules that carry out communication control according to the ARPA (Advanced Research Projects Agency) Internet hierarchical structure. More specifically, the communication control portion 15 includes a radio interface module 16, a MAC (Media Access Control) module 17, a buffer 18, an LLC (Logical Link Control) module 19, an IP (Internet Protocol) module 20, a routing table 21, a TCP module 22, a UDP module 23, and a routing daemon 24.

The radio interface module 16 belongs to the physical layer and has a plurality of channels. The radio interface module 16 modulates/demodulates transmission signals or reception signals according to a prescribed specification and transmits/receives signals through a channel selected among a plurality of channels. Upon receiving a packet from another radio device through the antenna 11, the radio interface module 16 detects the reception signal intensity RSSI of the received packet and outputs the detected reception signal intensity RSSI to the IP module 20.

The MAC module 17 belongs to the MAC layer and carries out the MAC protocol to perform various functions that will be described.

More specifically, the MAC module 17 broadcasts a Hello packet received from the routing daemon 24 through the radio interface module 16.

The MAC module 17 carries out re-transmission control of data (packets).

The buffer 18 belongs to the data link layer and temporarily stores packets.

The LLC module 19 belongs to the data link layer, and connects and releases a link with an adjacent radio device by carrying out an LLC protocol.

The IP module 20 belongs to the Internet layer and generates an IP packet. The IP packet includes an IP header and an IP data portion used to store a packet of a higher order protocol. Upon receiving data from the TCP module 22, the IP module 20 stores the received data in the IP data portion and produces an IP packet.

The IP module 20 maintains or disconnects a radio link with an adjacent radio device according to the following method in cooperation with the radio interface module 16 and the MAC module 17. Once the IP module 20 acts to maintain a radio link, the module generates a packet PKT_D including an advertisement that displays that the radio link has been maintained and transmits the packet to adjacent radio devices. Once maintaining the radio link, the IP module 20 acts to maintain information related to the maintained link.

When transmitting the generated IP packet, the IP module 20 searches the routing table 21 according to the OLSR protocol, i.e., the table driven type routing protocol, and determines a route for transmitting the generated IP packet. The IP module 20 then transmits the IP packet to the LLC module 19 and to a destination along the determined route.

The routing table 21 belongs to the Internet layer and stores routing information in association with each destination as will be described.

The TCP module 22 belongs to the transport layer and produces a TCP packet. The TCP packet includes a TCP header and a TCP data portion used to store data of a higher-order protocol. The TCP module 22 transmits the produced TCP packet to the IP module 20.

The UDP module 23 belongs to the transport layer, broadcasts an Update packet produced by the routing daemon 24, receives an Update packet broadcast by another radio device and outputs the packet to the routing daemon 24.

The routing daemon 24 belongs to the process/application layer, monitors the state of execution of other communication control modules, and processes requests from the other communication control modules.

The routing daemon 24 calculates an optimum route based on the routing information of a control packet (that refers to a Hello packet or a TC packet) received from another radio device according to the following method and dynamically produces a routing table 21 in the Internet layer.

Furthermore, when transmitting routing information in the radio communication network 100 to another radio device, the routing daemon 24 produces a control packet including various messages such as information related to adjacent radio devices and outputs the produced control packet to the MAC module 17.

Note that the radio devices 32 to 43 shown in FIG. 1 each have the same configuration as that of the radio device 31 shown in FIG. 2.

Figure 3:
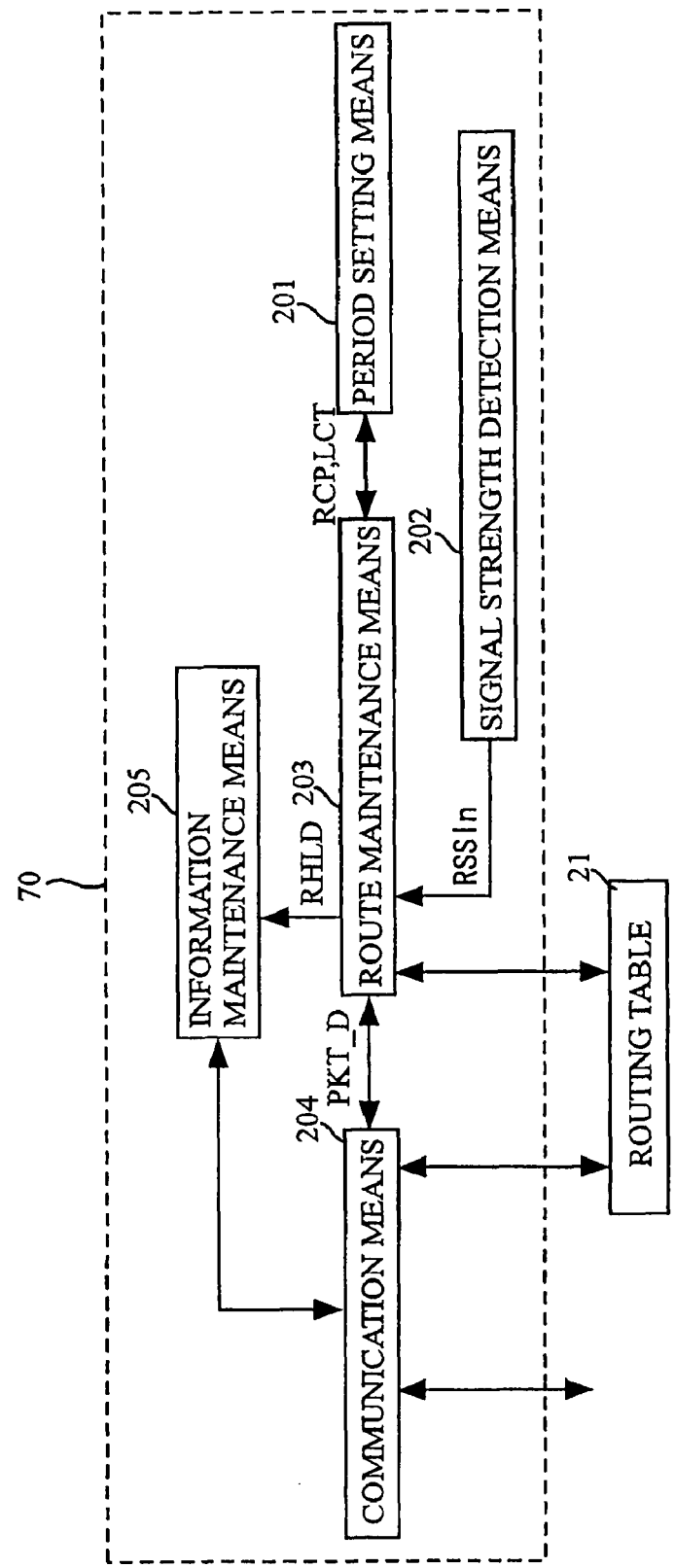
FIG. 3 is a functional block diagram of the radio interface module, the MAC module, and the IP module shown in FIG. 2 which realize the route maintenance means for carrying out maintenance of a radio link used as a route to carry out radio communication.

FIG. 3 is a functional block diagram of the radio interface module, the MAC module, and the IP module shown in FIG. 2 which realize the route maintenance means for carrying out maintenance of a radio link used as a route to carry out radio communication. A route maintenance means 70 includes a period setting means 201, a signal strength detection means 202, a route maintenance means 203, a communication means 204, and an information maintenance means 205. Upon receiving a period setting request RCP that requests a link connection confirmation period to be set from the route maintenance means 203, the period setting means 201 sets a link connection confirmation period LCT and outputs the set link connection confirmation period LCT to the route maintenance means 203.

Note that the link connection confirmation period is used by each of the radio devices 31 to 43 to confirm whether the radio link with each adjacent radio device is maintained or disconnected. The conventional radio device periodically receives a control packet from another radio device, reads out the effective period of the control packet written in the control packet and then confirms the continuity of the radio link. However, the link connection confirmation period according to the invention is a new period set separately from the effective period of a control packet. The link connection confirmation period is for example set to the transmission interval of control packets.

The signal strength detection means 202 detects the reception signal intensity RSSIn upon receiving a packet PKT and outputs the detected reception signal intensity RSSIn to the route maintenance means 203.

The route maintenance means 203 receives the reception signal intensity RSSIn from the signal strength detection means 202. The route maintenance means 203 receives a control packet, a data packet, an RTS (Request To Send) packet, a CTS (Clear To Send) packet, an ACK (Acknowledge) packet, and the like from the communication means 204. Upon receiving a control packet for the first time from the communication means 204, the route maintenance means 203 maintains the radio link with the radio device that has transmitted the control packet and generates a period setting request RCP and outputs the request to the period setting means 201.

Upon receiving a link connection confirmation period LCT from the period setting means 201, the route maintenance means 203 measures the link connection confirmation period LCT using a built-in timer (not shown) and determines whether any of a control packet, a data packet, an RTS packet, a CTS packet, and an ACK packet has normally been transmitted and/or received to/from an adjacent radio device in the link connection confirmation period. More specifically, the route maintenance means 203 determines whether the communication means 204 has normally transmitted and/or received any packet PKT to/from another radio device in the link connection confirmation period LCT.

Upon determining that the communication means 204 has normally transmitted and/or received a packet PKT to/from another radio device in the link connection confirmation period LCT, the route maintenance means 203 further determines whether the change amount of the reception signal intensity RSSIn is within a threshold range. Upon determining that the change amount of the reception signal intensity RSSIn is within the threshold range, the route maintenance means 203 maintains the routing table 21 as it is to maintain the link with the adjacent radio device, produces a dedicated packet PKT_D including an advertisement that displays the radio link is maintained and outputs the packet to the communication means 204. The route maintenance means 203 produces a signal RHLD that displays that the radio link is maintained and outputs the signal to the information maintenance means 205.

Meanwhile, upon determining that the change amount of the reception signal intensity RSSIn is outside the threshold range or that the communication means 204 has not normally transmitted and/or received a packet PKT to/from another radio device in the link connection confirmation period LCT, the route maintenance means 203 deletes, from the routing table 21, the routing information related to the radio link among the routing information stored in the routing table 21 and thus disconnects the radio link.

Upon receiving a control packet for the first time from the communication means 204 after the end of one link connection confirmation period LCT, the route maintenance means 203 maintains the radio link with the radio device that has transmitted the control packet, produces a period setting request RCP and outputs the request to the period setting means 201.

The communication means 204 produces an IP packet and searches for a route for transmitting the produced IP packet by referring to the routing table 21. The communication means 204 transmits the IP packet along the route found by the search.

The communication means 204 transmits and/or receives a packet PKT such as a control packet, a data packet, an RTS packet to/from another radio device and outputs a packet PKT received from another radio device to the route maintenance means 203.

The communication means 204 further outputs a control packet and a packet including a TC message received from another radio device to the information maintenance means 205.

Upon receiving a dedicated packet PKT_D from another radio device, based on the content of the dedicated packet PKT_D, the communication means 204 reduces the amount of communication or searches the routing table 21 for a different route and carries out radio communication with the transmission destination.

The information maintenance means 205 receives the control packet and the packet including the TC message from the communication means 204. Upon receiving the signal RHLD from the route maintenance means 203, the information maintenance means 205 maintains the content of the control packet and the packet including the TC message received from the communication means 204 at the time of receiving the signal RHLD.

Figure 4:
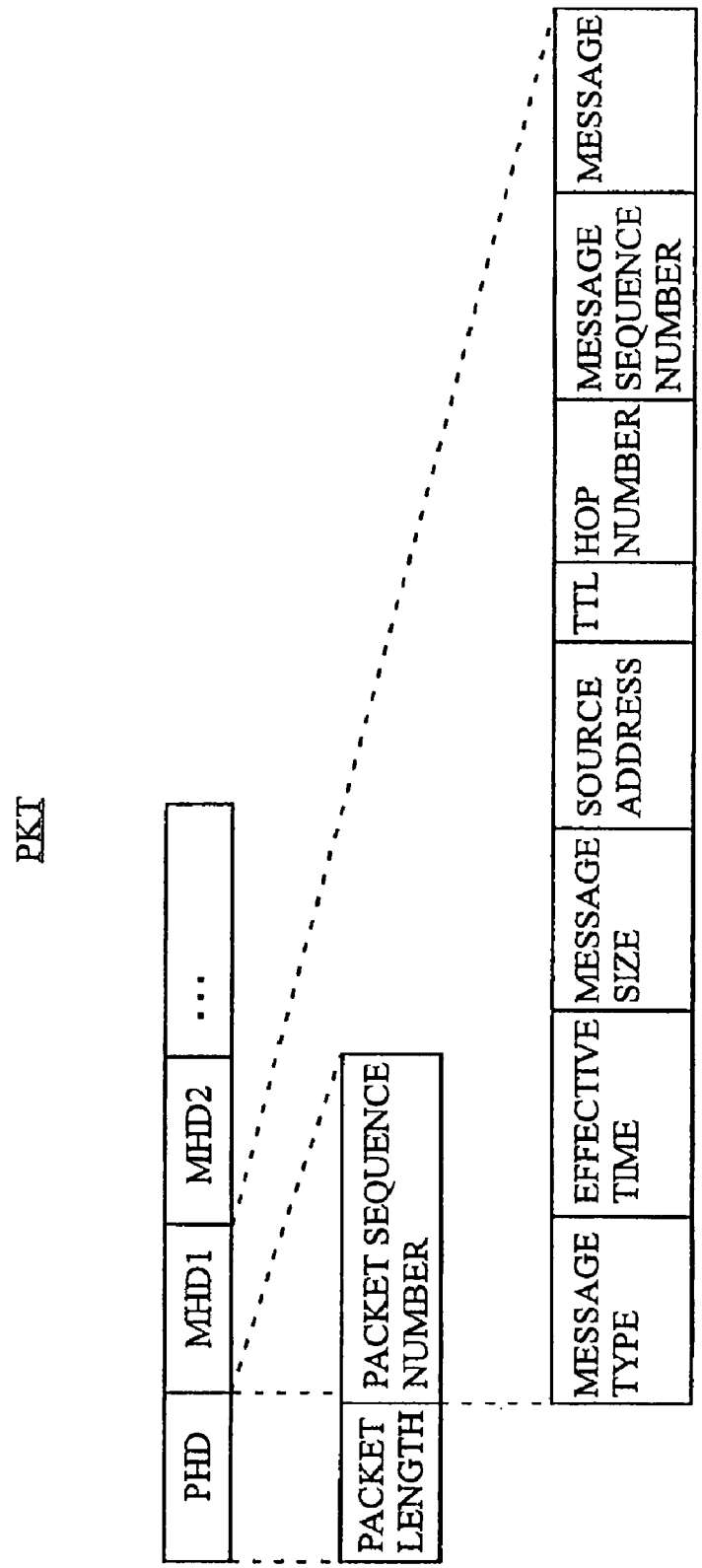
FIG. 4 is a diagram of the structure of a packet in the OLSR protocol.

FIG. 4 shows the structure of a packet PKT in the OLSR protocol. The packet PKT includes a packet header PHD, and message headers MHD1, MHD2, . . . . Note that the packet PKT is transmitted/received using the port number 698 of the UDP module 23.

The packet header PHD includes a packet length and a packet sequence number. The packet length includes 16-bit data and represents the byte number of the packet PKT. The packet sequence number includes 16-bit data and is used to specify which packet is new. The packet sequence number is incremented by "1" every time a new packet is generated. Therefore, larger packet sequence numbers represent newer packets PKT.

The message headers MHD1, MHD2, . . . each include a message type, effective time, a message size, a source address, a TTL, a hop number, a message sequence number, and a message.

The message type includes 8-bit data and represents the type of the message written in the message main body, and 0 to 127 have been reserved. The effective time includes 8-bit data and represents time for which the message must be maintained after the reception. The effective time includes a mantissa part and an exponent part.

The message size includes 16-bit data and represents the length of the message. The source address includes 32-bit data and represents the radio device that has produced the message. The TTL includes 8-bit data and specifies the maximum hop number with which a message is to be transferred. The TTL is decremented by "1" every time the message is transferred. If the TTL is "0" or "1", the message will not be transferred. The hop number includes 8-bit data and represents the hop number from the generator of the message. The hop number is initially set to "0" and incremented by "1" for every transfer. The message sequence number includes 16-bit data and represents an identification number allocated to each message. The message sequence number is incremented by "1" every time a message is produced. The message is a message to be transmitted.

In the OLSR protocol, various kinds of messages are transmitted and received using packets PKT having the structure shown in FIG. 4.

Figures 5, 6:
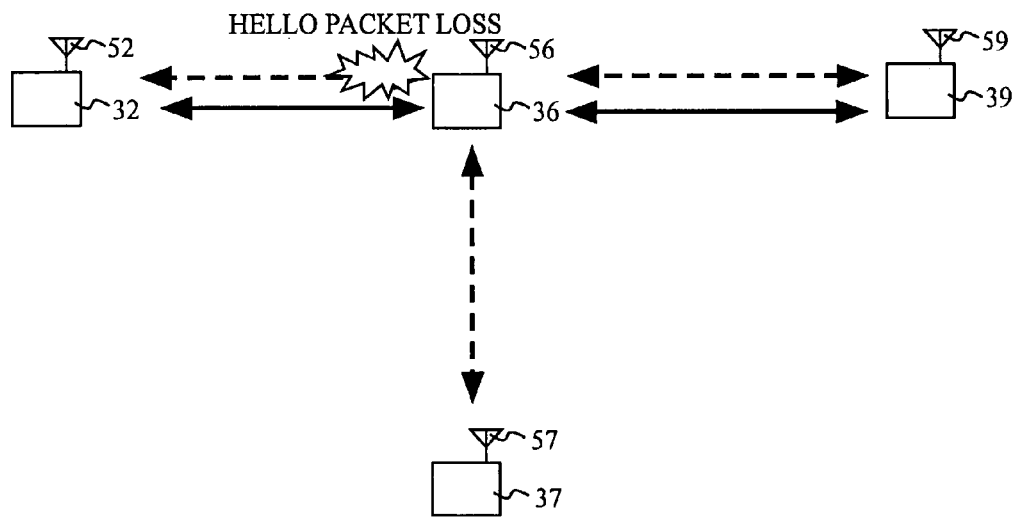
FIG. 5 shows the structure of the routing table shown in FIG. 2.
FIG. 6 is a diagram for use in illustrating the concept of how each radio device maintains/disconnects radio links with adjacent radio devices.

FIG. 5 shows the structure of the routing table 21 in FIG. 2. The routing table 21 includes a destination, a next radio device, and a hop number. The destination, the next radio device, and the hop number are associated with one another. The "destination" represents the IP address of the radio device at the destination. The "next radio device" represents the IP address of the radio device to which the packet PKT is to be transmitted next when the packet is transmitted to the destination. The "hop number" represents the hop number to the destination. In FIG. 1, for example if radio communication is carried out between the radio device 31 and the radio device 42 using the route from the radio device 31 through the radio device 32, the radio device 36, and the radio device 39 to the radio device 42, "3" is stored for the hop number in the routing table 21 of the radio device 32.

How the routing table 21 according to the OLSR protocol is produced will be described in detail. The radio devices 31 to 43 each transmit/receive Hello messages and TC messages in order to produce a routing table 21.

The Hello message is regularly transmitted in order to distribute information the radio devices 31 to 43 have. The radio devices 31 to 43 each receive the Hello messages and then collect information related to neighboring radio devices, and determine which radio devices are present around each device.

In the OLSR protocol, the radio devices 31 to 43 each manage local link information. The Hello message is a message used to form and transmit the local link information. The local link information includes a "link set", an "adjacent radio device set", a "two-hop adjacent radio device set", a "link set to these radio devices", an "MPR (Multi-point Relay) set" and an "MPR selector set."

The link set is a set of radio devices at which radio waves can directly arrive (adjacent radio devices), and each link is represented by the effective time of a pair of addresses for two radio devices. Note that the effective time is also used to represent whether the link is one-way or two-way.

The adjacent radio device set includes the addresses of the adjacent radio devices and the retransmission willingness of the radio devices. The two-hop adjacent radio device set represents a set of radio devices neighboring the adjacent radio devices.

The MPR set is a set of radio devices selected as MPRs. Note that an MPR is a relay device selected so that the radio devices 31 to 43 each transmit the packet PKT only once occasion when each packet PKT is transmitted to all the radio devices 31 to 43 in the radio communication network 100. The MPR selector set represents a set of the other radio devices that have selected the radio device as one of their MPRs.

The local link information is established generally as follows. In an initial stage, the radio devices 31 to 43 transmit Hello messages including their own address to adjacent radio devices in order to notify their presence. This is carried out by all the radio devices 31 to 43, and the radio devices 31 to 43 are notified of the presence of the radio devices around them and the addresses of these radio devices. In this way, the link set and the adjacent radio device set are formed.

The formed local link information continues to be transmitted by Hello messages on a regular-basis. This is repeated to gradually clarify if each link is two-way or which radio device exists beyond the adjacent radio devices. The radio devices 31 to 43 each store the local link information gradually formed in this manner.

Information related to the MPRs is also regularly transmitted by Hello messages and notified to the radio devices 31 to 43. The radio devices 31 to 43 each select several radio devices among adjacent radio devices as an MPR set so that they can ask these radio devices to retransmit a packet PKT transmitted from them. Information related to the MPR set is transmitted to the adjacent radio devices by Hello messages, and therefore the radio device that receives the Hello message manages the set of the radio devices that have selected the device as an MPR as a "MPR selector set." In this way, the radio devices 31 to 43 each can instantaneously determine whether a packet PKT received from a radio device should be retransmitted.

Once a local link set is formed in each of the radio devices 31 to 43 by transmission/reception of Hello messages, a TC message to notify the topology of the entire radio communication network 100 is transmitted to the radio devices 31 to 43. The TC message is transmitted regularly by all the radio devices selected as MPRs. The TC messages include links between the radio devices and the MPR selector set, and therefore all the radio devices 31 to 43 in the radio communication network 100 can be informed of all the MPR sets and all the MPR selector sets and of the topology of the entire radio communication network 100 based on all the MPR sets and all the MPR selector sets. The radio devices 31 to 43 each calculate the shortest routes using the topology of the entire radio communication network 100 and produces a routing table based on the routes.

Note that the radio devices 31 to 43 frequently exchange TC messages separately from the Hello messages. The MPRs are also used to exchange the TC messages.

The UDP module 23 of each of the radio devices 31 to 43 transmits/receives the above-described Hello messages and the TC messages, and the routing daemon 24 recognizes the topology of the entire radio communication network 100 based on the Hello messages and the TC messages which the UDP module 23 has received, calculates the shortest routes based on the topology of the entire radio communication network 100, and dynamically produces the routing table 21 shown in FIG. 5 based on the routes.

Now, how the radio devices 31 to 43 each maintain/disconnect a radio link with an adjacent radio device will be described. FIG. 6 is a diagram for use in illustrating the concept of how the radio devices 31 to 43 each maintain/disconnect a radio link with an adjacent radio device. Note that in FIG. 6, the bold solid line represents the flow of application data that is a unicast frame, while the bold broken line represents the flow of a control packet used to maintain/disconnect a radio link.

In the radio communication network 100 shown in FIG. 1, the radio device 36 periodically transmits/receives a control packet with the adjacent radio devices 32, 37, and 39, and forms radio links with the radio devices 32, 37, and 39. The radio device 36 relays a data packet between the radio device 32 and the radio device 39.

In this state, upon normally receiving a control packet from the radio device 32, the communication means 204 of the radio device 36 outputs the received control packet to the route maintenance means 203, and the route maintenance means 203 detects the source address (the IP address IPadd32 of the radio device 32, see FIG. 4) of the control packet received from the communication means 204 and maintains the radio link between the radio devices 32 and 36.

The route maintenance means 203 of the radio device 36 produces a period setting request RCP and outputs the produced request to the period setting means 201. The period setting means 201 responds to the period setting request RCP from the route maintenance means 203 to set a link connection confirmation period LCT and output the link connection confirmation period LCT to the route maintenance means 203. Upon receiving the link connection confirmation period LCT from the period setting means 201, the route maintenance means 203 counts the link connection confirmation period LCT using the built-in timer and determines whether the communication means 204 has normally received any packet PKT such as a control packet and a data packet from the radio device 32 within the link connection confirmation period LCT.

In this case, after the radio device 32 normally transmits a control packet to the radio device 36 and a link connection confirmation period LCT is set, the radio device 32 successfully transmits the data packet to the radio device 36 while keeping the quality of communication and fails to transmit the next control packet to the radio device 36 because of a packet loss. The data packet is transmitted by unicast (see the bold solid line), and the control packet is broadcast. Therefore, a packet loss is more likely to occur for a control packet than a data packet.

Then, the communication means 204 of the radio device 36 does not receive a control packet but normally receives a data packet from the radio device 32 in the link connection confirmation period LCT. The communication means 204 of the radio device 36 outputs the data packet normally received from the radio device 32 to the route maintenance means 203. The signal strength detection means 202 of the radio device 36 detects the reception signal intensity RSSIn at the time of receiving the data packet and outputs the intensity to the route maintenance means 203.

The route maintenance means 203 receives the data packet from the communication means 204 in the link connection confirmation period LCT and receives the reception signal intensity RSSIn from the signal strength detection means 202 at the time of receiving the data packet. The route maintenance means 203 calculates the difference ΔRSSI between the reception signal intensity RSSIn-1 of the previously received packet PKT and the reception signal intensity RSSIn of the presently received packet PKT, and confirms that the difference ΔRSSI is within the threshold range.

Then, the route maintenance means 203 maintains the routing information between the radio devices 32 and 36 in the routing table 21 and thus maintains the radio link between the radio devices 32 and 36 because the communication means 204 receives a data packet from the radio device 32 in the link connection confirmation period LCT and the communication quality is held at the time of receiving the data packet.

Note that the communication means 204 of the radio device 36 periodically normally receives a control packet from the radio devices 37 and 39, so that the route maintenance means 203 maintains the radio link between the radio devices 36 and 37 and the radio link between the radio devices 36 and 39.

Figure 7:
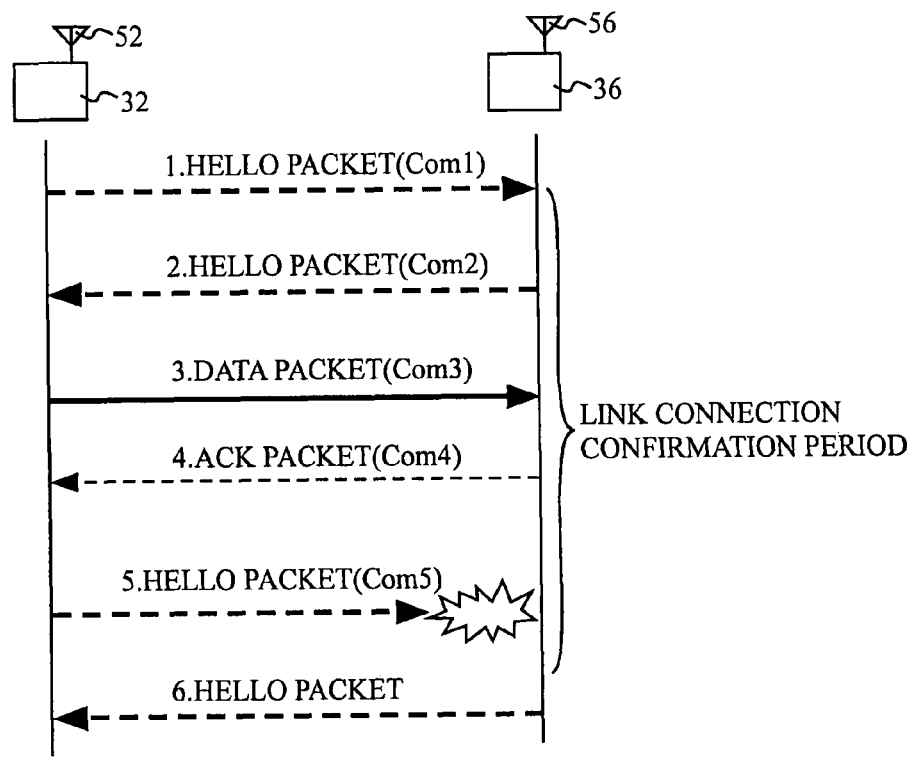
FIG. 7 is a diagram for use in illustrating a condition for maintaining a radio link.

FIG. 7 is a diagram for use in illustrating a condition for maintaining a radio link. The radio device 36 normally receives a control packet from the radio device 32 (see Com1) and starts a link connection confirmation period LCT. The radio device 36 transmits a control packet to the radio device 32 (see Com2), receives a data packet from the radio device 32 (see Com3), and transmits an ACK packet to the radio device 32 (see Com4) normally and sequentially and fails to receive a control packet from the radio device 32 because of a packet loss (see com5) in the link connection confirmation period LCT.

In this way, the radio device 36 fails to receive the control packet from the radio device 32 in the link connection confirmation period LCT (see Com5) but normally receives the data packet from the radio device 32 in the link connection confirmation period LCT (see Com3), and therefore the radio device 36 maintains the radio link with the radio device 32.

Note that if the radio device 36 normally receives the control packet from the radio device 32 in the link connection confirmation period LCT, the radio device 36 naturally maintains the radio link with the radio device 32. Therefore, according to the invention, if the radio device 36 normally receives any packet PKT from the radio device 32 in the link connection confirmation period LCT, the radio device 36 maintains the radio link with the radio device 32.

If the radio device 36 receives no packet PKT from the radio device 32 in the link connection confirmation period LCT, the radio device 36 disconnects the radio link with the radio device 32.

FIG. 8 shows specific examples of the routing table 21. The radio device 36 holds a routing table 21A (see (a) in FIG. 8) at the start of link connection confirmation period LCT. In other words, the radio device 36 holds the routing table 21A including routing information in which the radio devices 32, 37, and 39 are destinations.

In the link connection confirmation period LCT, the communication means 204 of the radio device 36 fails to receive a control packet from the radio device 32 (see Com5) and successfully receives a data packet from the radio device 32 (see Com3). The communication means 204 of the radio device 36 outputs the received data packet to the route maintenance means 203. Upon receiving the data packet from the communication means 204, the route maintenance means 203 confirms that the communication quality at the time of receiving the data packet is maintained. The route maintenance means 203 maintains the routing table 21A as it is and updates it to the routing table 21B (see (b) in FIG. 8). Therefore, the route maintenance means 203 maintains the radio link between the radio device 32 and the radio device 36.

Note that when the communication means 204 of the radio device 36 does not receive a packet PKT from the radio device 32 in the link connection confirmation period LCT, the routing information in the first row in the routing table 21A is deleted, so that the radio link between the radio device 32 and the radio device 36 is disconnected.

FIG. 9 shows an example of a dedicated packet PKT_D. Upon maintaining the radio link between the radio device 32 and the radio device 36, the route maintenance means 203 of radio device 36 produces a dedicated packet PKT_D1 including [radio link 32-36: present, low quality (being recovered) /radio link 37-36: present, high quality /radio link 36-39: present, high quality] and outputs the packet to the communication means 204, so that the communication means 204 transmits the dedicated packet PKT_D1 to the radio devices 32, 37, and 39 (adjacent radio devices).

Figure 10:
FIG. 10 shows other specific examples of the routing table.
Figure 11:
FIG. 11 shows other specific examples of the routing table.
Figure 12:
FIG. 12 shows other specific examples of the routing table.

FIGS. 10 to 12 show other specific examples of the routing table.

Before receiving the dedicated packet PKT_D1 from the radio device 36, the radio device 32 has the routing table 21C (see (a) in FIG. 10). Upon receiving the dedicated packet PKT_D1 from the radio device 36, the communication means 204 of the radio device 32 outputs the received dedicated packet PKT_D1 to the route maintenance means 203. Upon receiving dedicated packet PKT_D1, the route maintenance means 203 of the radio device 32 detects the content of the received dedicated packet PKT_D1 and detects the presence of the radio links 32-36, 37-36, and 39-36. The route maintenance means 203 of the radio device 32 maintains the routing table 21C as it is and updates it to the routing table 21D (see (b) in FIG. 10), so that the radio link 32-36 is maintained.

The route maintenance means 203 of the radio device 37 responds to the dedicated packet PKT_D1 to similarly maintain the routing table 21E (see (a) in FIG. 11) as it is and updates it to the routing table 21F (see (b) in FIG. 11), so that the radio link 37-36 is maintained.

The route maintenance means 203 of the radio device 39 responds to the dedicated packet PKT_D1 to similarly maintain the routing table 21G (see (a) in FIG. 12) as it is and updates it to the routing table 21H (see (b) in FIG. 12), so that the radio link 39-36 is maintained.

In this way, the radio device 36 maintains the radio links within the link connection confirmation period LCT and notifies the radio devices 32, 37, and 39 (the adjacent radio devices) of all the radio links 32-36, 37-36, and 39-37 maintained by the radio device 36. In this way, the radio links 32-36, 37-36, and 39-37 maintained in the radio device 36 are shared among the radio devices 32, 36, 37, and 39, and in the radio devices 32, 37, and 39 adjacent to the radio device 36, the routing tables are updated based on the radio links maintained in the radio device 36.

Figure 13:
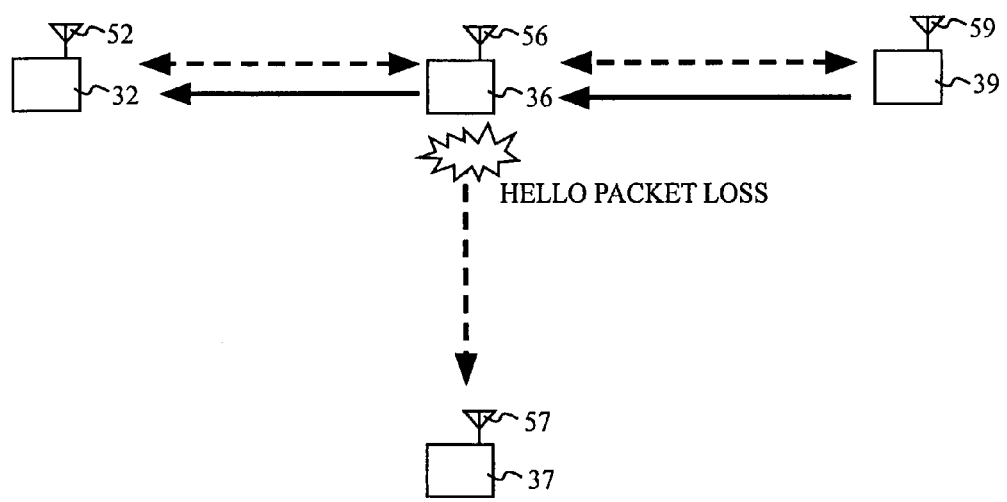
FIG. 13 is another diagram for use in illustrating the concept of how each radio device maintains/disconnects a radio link with an adjacent radio device.

FIG. 13 is another diagram for use in illustrating how the radio devices 31 to 43 maintain/disconnect radio links with their adjacent radio devices. In FIG. 13, the bold solid line represents the flow of application data that is a unicast frame, and the bold broken line represents the flow of a control packet used to maintain/disconnect a route.

The radio device 36 relays a data packet from the radio device 39 to the radio device 32 at a standard communication amount of Dstd or more and receives a control packet from the radio devices 32 and 39 periodically and normally. In this state, the communication means 204 of the radio device 36 fails to receive a control packet from radio device 37 in the link connection confirmation period LCT.

Since the communication means 204 normally relays the data packet from the radio device 39 to the radio device 32, the route maintenance means 203 of the radio device 36 maintains the radio link between the radio devices 36 and 37 that is not used to relay the radio communication. More specifically, while the radio device 36 relays the data packet from the radio device 39 to the radio device 32, the radio device 37 serves as a hidden terminal to the radio devices 32 and 39, and a control packet transmitted from the radio device 37 to the radio device 36 easily disappears because of a packet loss. Therefore, if the radio device 36 cannot normally receive a control packet from the radio device 37 while radio communication is normally carried out at a standard communication amount of Dstd or more in the route from the radio device 39 through the radio devices 36 to the radio device 32, it is not because the radio communication state between the radio devices 36 and 37 is deteriorated but because the radio devices 32, 37, and 39 act as a hidden terminal to one another. Therefore, in such a state, the route maintenance means 203 of the radio device 36 is positioned so as to maintain the radio link between the radio devices 36 and 37 even if a control packet from the radio device 37 cannot be received normally. More specifically, according to the invention, not only a radio link actually used in radio communication, but also a radio link that is not used is maintained.

Note that the route maintenance means 203 of the radio device 36 maintains the radio link between the radio device 36 and the radio device 37 only when the channel used for radio communication between the radio devices 36 and 37 and the channel used for radio communication between the radio devices 36 and 39 affect each other's radio communication qualities. If the radio communication qualities do not affect each other in these two radio links, a packet loss due to collision does not occur.

Whether the radio communication qualities in the two radio links-affect each other is determined as follows For example, it is determined that the radio communication qualities in the two radio links affect each other if the frequency band of the channel used for radio communication between the radio devices 36 and 37 and the frequency band of the channel used for radio communication between the radio devices 36 and 39 at least partly overlap. It is determined that the radio communication qualities in the two radio links affect each other if the packet loss reaches a standard value or more.

The radio link 36-37 may be maintained, if it is determined that the radio devices 39 and 37 are positioned such as to be hidden terminals with respect to each other. Whether they are positioned such as to be hidden terminals with respect to each other may be determined by referring to the set of adjacent radio-devices included in control packets (Hello packet) received from the adjacent radio devices. In the example shown in FIG. 13, if the radio device 37 is not included in the set of adjacent radio devices in a control packet (Hello packet) which the radio device 36 has received from the radio device 39, and the radio device 39 is not included in the set of adjacent radio devices in a control packet (Hello packet) which the radio device 36 has received from the radio device 37, the radio device 36 determines that the radio devices 37 and 39 are positioned such as to be hidden terminals with respect to each other.

Therefore, the radio device 36 determines whether the radio devices 37 and 39 are positioned such as to be hidden terminals with respect to each other by the above-described method, and if the radio devices 37 and 39 are positioned such as to be hidden terminals with respect to each other, the radio link 36-37 is maintained.

If the radio devices 37 and 39 are positioned such as to be hidden terminals with respect to each other, the radio communication quality between the radio devices 36 and 37 and the radio communication quality between the radio devices 36 and 39 affect each other. Therefore, the radio device 36 determines whether the radio device 37 and the radio device 39 are in the positions such as to be hidden terminals with respect to each other and maintains the radio link 36-37, which is equivalent to the radio device 36 maintaining the radio link 36-37 upon determining the mutual effect of the radio communication qualities based on the positional relation between the radio device (radio device 39) adjacent to the radio link 36-39 and the radio device (radio device 37) adjacent to the radio device 36-37.

Figure 14:
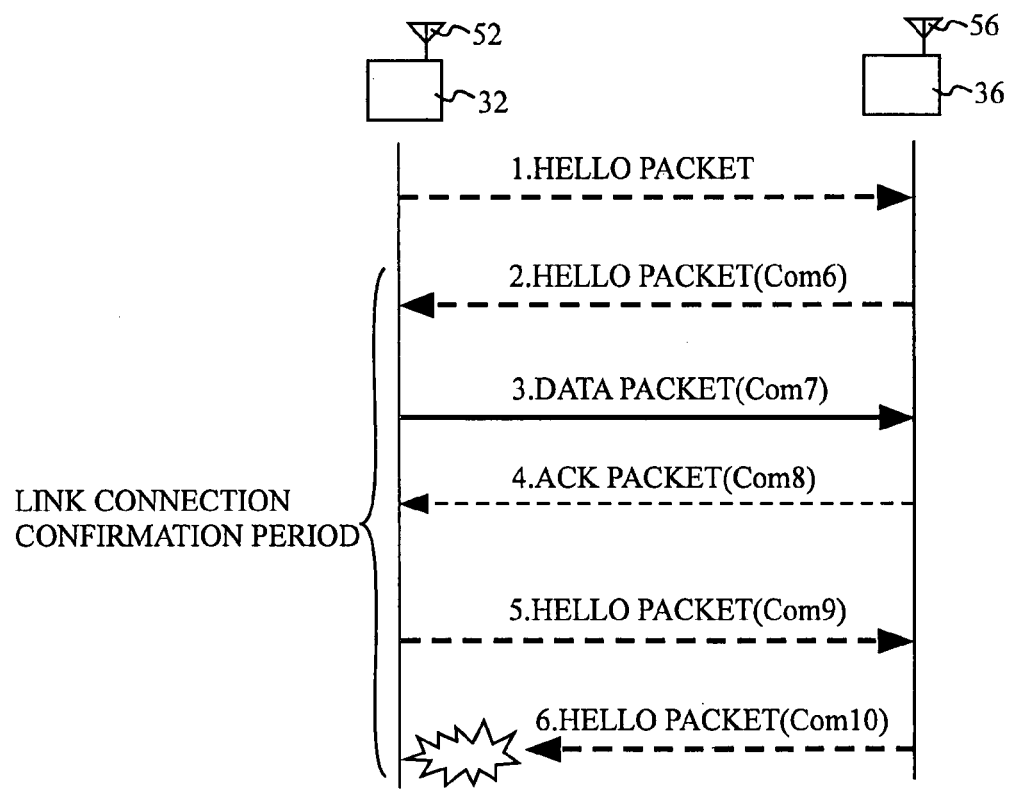
FIG. 14 is another diagram for use in illustrating a condition for maintaining a radio link.

FIG. 14 is another diagram for use in illustrating the condition for maintaining a radio link. The radio device 32 normally receives a control packet from the radio device 36 (see Com6) and starts the link connection confirmation period LCT. The radio device 32 normally and sequentially transmits a data packet to the radio device 36 (see Com7), receives an ACK packet from the radio device 36 (see Com8) and transmits a control packet to the radio device 36 (see Com9) within the link connection confirmation period LCT, and fails to receive a control packet from the radio device 36 because of a packet loss (see Com10).

In this way, the radio device 32 fails to receive a control packet from the radio device 36 within the link connection confirmation period LCT but normally transmits a data packet to the radio device 36 (and normally receives an ACK packet from the radio device 36) within the link connection confirmation period LCT and therefore the radio link between the radio devices 32 and 36 is maintained.

Note that upon normally receiving a control packet from the radio device 36 within the link connection confirmation period LCT, the radio device 32 naturally maintains the radio link with the radio device 36. Therefore, according to the invention, the radio device 32 on the transmitting side maintains the radio link with the radio device 36 only if the radio device 32 normally transmits or receives any packet PKT to or from the radio device 36 within the link connection confirmation period LCT.

The radio device 32 disconnects the radio link with the radio device 36 if no packet PKT is transmitted or received between the radio devices 32 and 36 within the link connection confirmation period LCT.

Figure 15:
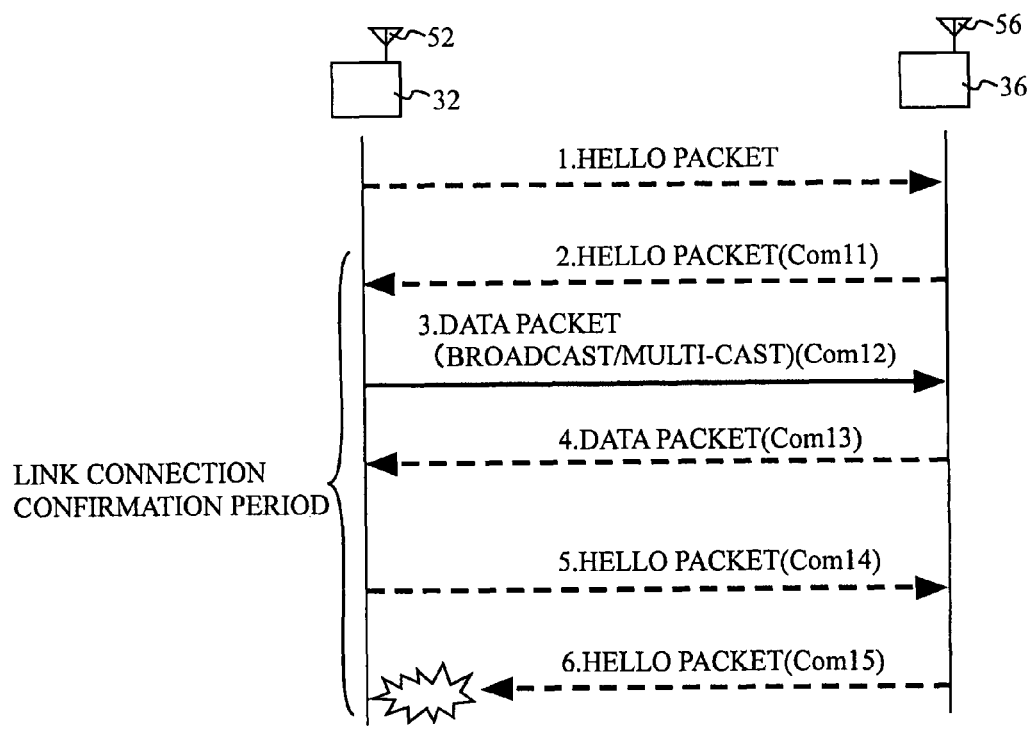
FIG. 15 is yet another diagram for use in illustrating a condition for maintaining a radio link.

FIG. 15 is yet another diagram for use in illustrating the condition for maintaining a radio link. The radio device 32 normally receives a control, packet from the radio device 36 (see Com11) and starts the link connection confirmation period LCT. The radio device 32 transmits a data packet to the radio device 36 by broadcast or multi-cast (Com12), receives a data packet from the radio device 36 by flooding (see Com13), and transmits a control packet to the radio device 36 (see Com14) normally and sequentially within the link connection confirmation period LCT. Meanwhile, the radio device 32 fails to receive a control packet from the radio device 36 because of a packet loss within the link connection confirmation period LCT (see Com15).

In this way, the radio device 32 fails to receive a control packet from the radio device 36 within the link connection confirmation period LCT (see Com15) but normally receives a data packet (passively receives an ACK packet) from the radio device 36 by the flooding within the link connection confirmation period LCT, and therefore the radio link between the radio devices 32 and 36 is maintained (see Com13).

Note that upon normally receiving a control packet from the radio device 36 within the link connection confirmation period LCT, the radio device 32 naturally maintains the radio link with the radio device 36. Therefore, according to the invention, the radio device 32 on the transmitting side maintains the radio link with the radio device 36 only if the radio device 32 normally transmits or receives any packet PKT to or from the radio device 36 within the link connection confirmation period LCT.

The radio device 32 disconnects the radio link with the radio device 36 if no packet PKT is transmitted or received between the radio devices 32 and 36 within the link connection confirmation period LCT.

As described above, according to the invention, upon normally transmitting/receiving any packet PKT to/from an adjacent radio device in the link connection confirmation period LCT while the communication quality is maintained, the route maintenance means 203 of each of the radio devices 31 to 43 maintains the radio link with the adjacent radio device.

The route maintenance means 203 of each of the radio devices 31 to 43 disconnects the radio link with an adjacent radio device if the communication quality of a packet PKT received within the link connection confirmation period LCT is not maintained or no packet PKT is received within the link connection confirmation period LCT.

Figure 16A:
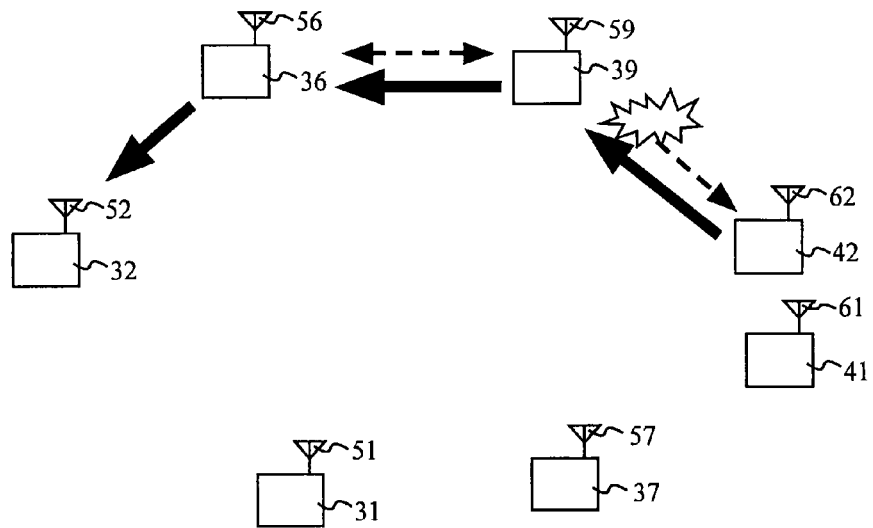
FIGS. 16A and 16B are diagrams for use in illustrating a communicating method according to the invention.
Figure 16B:
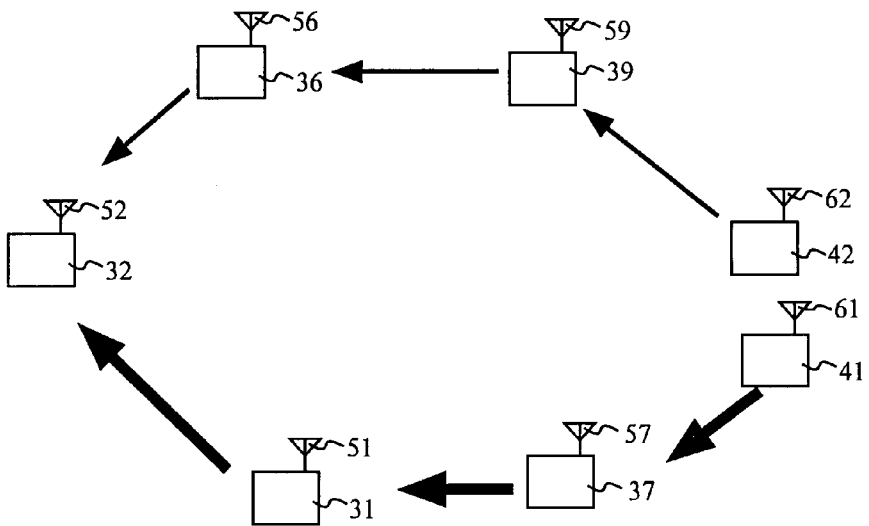

FIGS. 16A and 16B are diagrams for use in illustrating the concept of a communicating method according to the invention. FIG. 17 shows another example of the dedicated packet PKT_D. FIG. 18 shows another specific example of the routing table 21. Note that in FIGS. 16A and 16B, the solid line and the bold solid line represent the flow of application data that is a unicast frame, while the bold broken line represents the flow of a control packet used to maintain/disconnect a radio link. The thickness of the solid line represents the amount of communication, and the thicker line represents a larger amount of communication.

Among the radio devices 31 to 43 shown in FIG. 1, the radio device 42 transmits a data packet to the radio device 32 via the radio devices 39 and 36. The radio device 39 fails to receive a control packet from the radio device 42 within the link connection confirmation period LCT (see FIG. 16A). In this case, the communication means 204 of the radio device 39 relays the data packet from the radio device 42 to the radio device 36 while maintaining the communication quality and therefore receives the data packet from the radio device 42 while the communication quality is maintained in the link connection confirmation period LCT. Therefore, the route maintenance means 203 of the radio device 39 maintains the radio link between the radio device 39 and the radio device 42, produces a dedicated packet PKT_D2 (see FIG. 17) for output to the communication means 204, and transmits the dedicated packet PKT_D2 (see FIG. 17) to the adjacent radio devices 36, 41, and 42.

In this case, the dedicated packet PKT_D2 includes information including [radio link 36-39: present, high quality/radio link 39-42: present, low quality (being recovered)/radio link 39-41: present, high quality].

The communication means 204 of the radio device 42 receives the dedicated packet PKT_D2 from the radio device 39 and outputs the received dedicated packet PKT_D2 to the route maintenance means 203. The route maintenance means 203 of the radio device 42 refers to the information [radio link 36-39: present, high quality/radio link 39-42: present, low quality (being recovered)/radio link 39-41: present, high quality] included in the dedicated packet PKT_D2 received from the communication means 204, detects the radio link 39-42 between the radio device 39 and the radio device 42 being maintained, and maintains the radio link 39-42. The communication means 204 of the radio device 42 refers to the information [radio link 36-39: present, high quality/radio link 39-42: present, low quality (being recovered)/radio link 39-41: present, high quality] included in the dedicated packet PKT_D2 and determines that the radio link 39-42 between the radio device 39 and the radio device 42 is a low quality link and in the process of being recovered.

Then, using the maintained radio link 39-42, the communication means 204 of the radio device 42 reduces the communication amount and transmits a data packet to the radio device 32 (see the solid line in FIG. 16B).

On the other hand, the communication means 204 of the radio device 41 positioned adjacent to the radio device 42 receives the dedicated packet PKT_D2 from the radio device 39 and outputs the received dedicated packet PKT_D2 to the route maintenance means 203. The route maintenance means 203 of the radio device 41 refers to the information [radio link 36-39: present, high quality/radio link 39-42: present, low quality (being recovered)/radio link 39-41: present, high quality] included in the dedicated packet PKT_D2 and detects the radio link 39-41 between the radio device 39 and the radio device 41 being maintained and maintains the radio link 39-41. The communication means 204 of the radio device 41 refers to the information [radio link 36-39: present, high quality/radio link 39-42: present, low quality (being recovered)/radio link 39-41: present, high quality] included in the dedicated packet PKT_D2 and determines that the radio link 39-42 between the radio device 39 and the radio device 42 is a low quality link and in the process of being recovered.

Then, the communication means 204 of the radio device 41 searches the routing table 21J (see FIG. 18), selects a route via the radio device 37, not the radio device 39, and transmits the data packet to the radio device 32 (see FIG. 16B).

Here, the communication means 204 of the radio device 41 selects the route via the radio device 37, not the radio device 39, to transmit the data packet to the radio device 32 though the radio link 39-41 is maintained and the communication quality is high. This is for the following reasons.

The radio link 39-42 is a low quality link and in the process of being recovered, and therefore the radio device 41 is prevented from transmitting another packet to the radio device 39 to prevent that data packet collision occurs in the radio device 39, then the radio device 39 cannot normally receive either a control packet or a data packet within the link connection confirmation period LCT and the radio link 39-42 or the radio link 39-41 could be disconnected.

In this way, according to the invention, radio communication is carried out so that if any packet PKT is normally received within the link connection confirmation period LCT and the radio link is maintained, the adjacent radio devices are notified of the maintained radio link, and the maintained radio link can be prevented from being disconnected by the adjacent radio devices as well.

Figure 19:
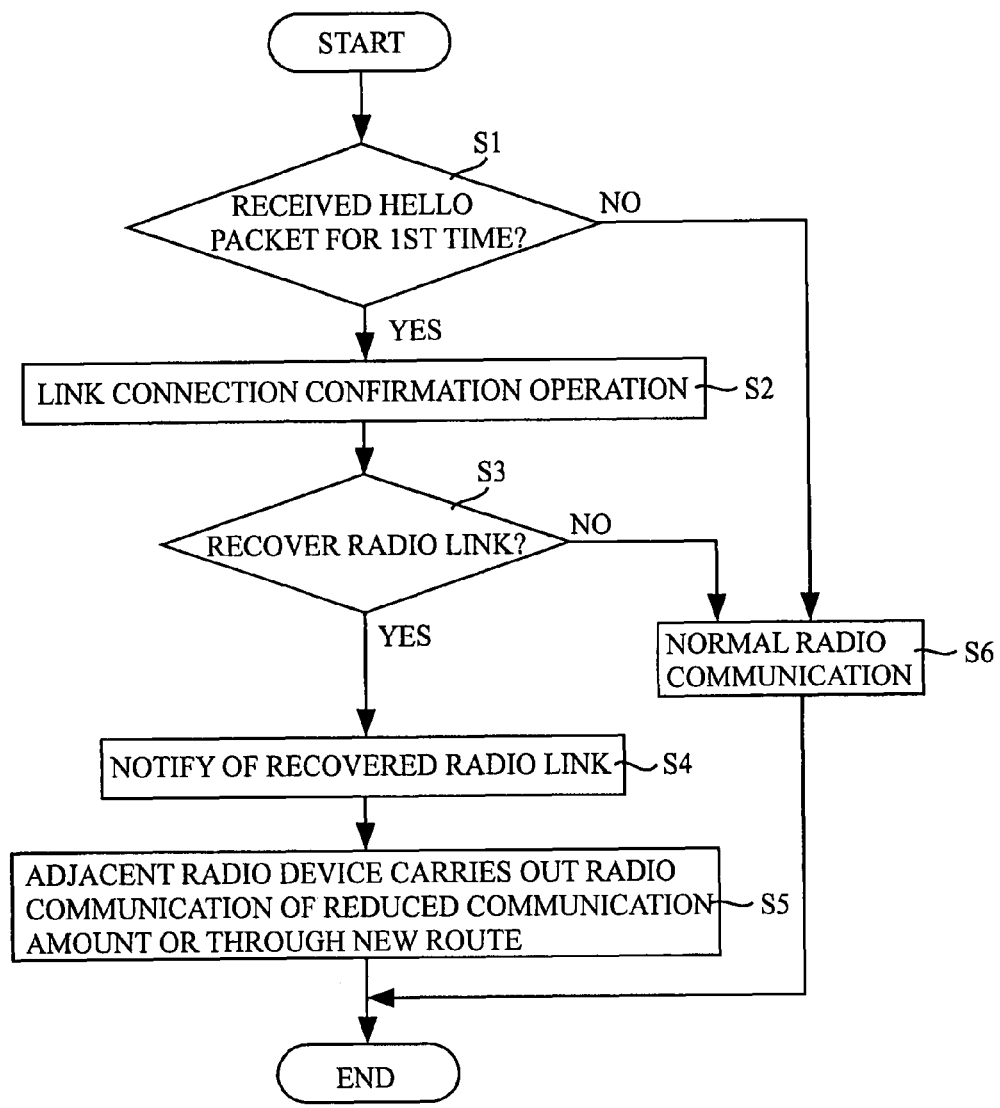
FIG. 19 is a flowchart for use in illustrating communicating operation in the radio communication network shown in FIG. 1.

FIG. 19 is a flowchart for use in illustrating communication operation in the radio communication network 100 in FIG. 1. As the series of operation starts, the route maintenance means 203 of each of the radio devices 31 to 43 determines whether the communication means 204 has received a control packet for the first time (step S1). If it is determined in step S1 that the communication means 204 has not received a control packet for the first time, the series of operation proceeds to step S6.

On the other hand, if it is determined in step S1 that the communication means 204 has normally received a control packet for the first time, the route maintenance means 203 of each of the radio devices 31 to 43 carries out link connection confirmation operation (step S2). The route maintenance means 203 of each of the radio devices 31 to 43 determines whether the radio link has been recovered in the link connection confirmation operation (step S3).

Upon determining in step S3 that the radio link has been recovered, the route maintenance means 203 of each of the radio devices 31 to 43 notifies of the recovered radio link to the adjacent radio devices (step S4). More specifically, the route maintenance means 203 of each of the radio devices 31 to 43 produces a dedicated packet PKT_D including the recovered radio link and information related to the radio link and transmits the produced dedicated packet PKT_D to the adjacent radio devices by the communication means 204.

The communication means 204 of each of the adjacent radio devices receives the dedicated packet PKT_D and reads the recovered radio link and the information related to the radio link in the dedicated packet PKT_D. The communication means 204 of the adjacent radio device, when carrying out radio communication using the recovered radio link, reduces the communication amount. The communication means 204 of the adjacent radio device searches the routing table 21 and determines a new route that uses a radio link other than the recovered radio link to carry out radio communication when carrying out radio communication using the radio link other than the recovered radio link (step S5).

On the other hand, if it is determined in step S1 that the communication means 204 has not received a control packet for the first time or if it is determined in step S3 that the radio link has not been recovered, the communication means 204 of each of the radio devices 31 to 43 carries out normal radio communication (step S6). More specifically, the communication means 204 of each of the radio devices 31 to 43 searches the routing table 21, determines a route to the destination without carrying out the link connection confirmation operation and carries out radio communication with the destination using the determined route. After step S5 or S6, the series of operation ends.

Figure 20:
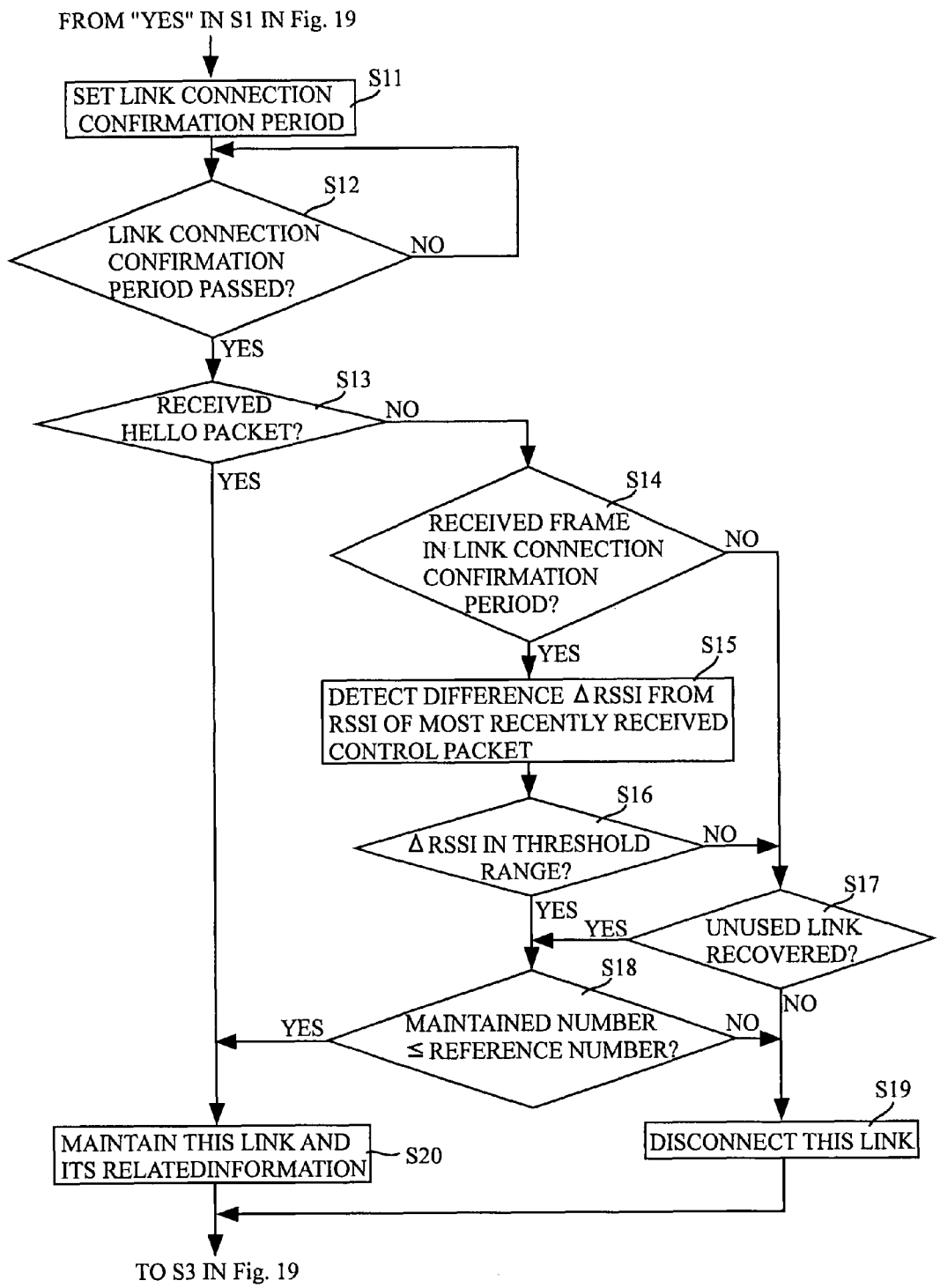
FIG. 20 is a flowchart for use in illustrating detailed operation in step S2 shown in FIG. 19.

FIG. 20 is a flowchart for use in illustrating the detailed operation in step S2 in FIG. 19. If it is determined in step S1 in FIG. 19 that the communication means 204 has received a control packet for the first time, the route maintenance means 203 of each of the radio devices 31 to 43 produces a period setting request RCP for output to the period setting means 201, and the period setting means 201 responds to the period setting request RCP to set a link connection confirmation period LCT (step S1) and outputs the link connection confirmation period LCT to the route maintenance means 203.

Upon receiving the link connection confirmation period LCT, the route maintenance means 203 of each of the radio devices 31 to 43 counts the link connection confirmation period LCT using a built-in timer and determines whether the link connection confirmation period LCT has passed (step S12).

When the link connection confirmation period LCT has passed, the route maintenance means 203 of each of the radio devices 31 to 43 determines whether a control packet has been received in the link connection confirmation period LCT (step S13).

If it is determined in step S13 that a control packet has been received within the link connection confirmation period LCT, the series of operation proceeds to step S20.

On the other hand, if the route maintenance means 203 of each of the radio devices 31 to 43 determines in step S13 that a control packet has not been received within the link connection confirmation period LCT, it is further determined whether a frame of a data packet other than a control packet has been received from the adjacent radio device within the link connection confirmation period LCT (step S14).

If it is determined in step S14 that such a frame has not been received in the link connection confirmation period LCT, the series of operation proceeds to step S17.

Meanwhile, if it is determined in step S14 that the communication means 204 has received a frame within the link connection confirmation period LCT, the route maintenance means 203 of each of the radio devices 31 to 43 detects the difference $\Delta$RSSI between the reception signal intensity RSSIn-1 of the most recently received control packet and the reception signal intensity RSSIn of the frame (data packet) (step S15).

The route maintenance means 203 of each of the radio devices 31 to 43 determines whether the difference $\Delta$RSSI is within the threshold range (step S16). Note that, for example, the threshold range is set to the change width of the reception signal intensity RSSI in the radio communication space in which the radio devices 31 to 43 are positioned. Therefore, it is determined in step S16 whether a frame (data packet) has been received by radio communication that satisfies the standard radio communication quality requirement.

If it is determined in step S16 that the difference $\Delta$RSSI is within the threshold range, the series of operation proceeds to step S18.

On the other hand, if it is determined in step S14 that a frame has not been received in the link connection confirmation period LCT, or it is determined in step S16 that the difference $\Delta$RSSI is outside the threshold range, the route maintenance means 203 of each of the radio devices 31 to 43 further determines whether or not to recover a unused radio link (step S17). More specifically, the route maintenance means 203 of each of the radio devices 31 to 43 determines whether or not a prescribed amount of radio communication is normally carried out within the link connection confirmation period LCT and thus determines whether or not to recover the unused link. In other words, the route maintenance means 203 of each of the radio devices 31 to 43 determines that the unused link is to be recovered when the prescribed amount of radio communication is normally transmitted/received within the link connection confirmation period LCT and that the unused link is not to be recovered if the prescribed amount of radio communication is not normally transmitted/received within the link connection confirmation period LCT.

If it is determined in step S16 that the difference $\Delta$RSSI is within the threshold range or if it is determined in step S17 that the unused link is to be recovered, the route maintenance means 203 of each of the radio devices 31 to 43 determines further whether the number of times that the radio link was maintained is not more than a reference number (step S18).

If it is determined in step S17 that the unused link is not to be recovered or if it is determined in step S18 that the number of times that the radio link was maintained is more than the reference number, the route maintenance means 203 of each of the radio devices 31 to 43 disconnects the link (step S19). More specifically, the route maintenance means 203 of each of the radio devices 31 to 43 disconnects the link by deleting the routing information of the link from the routing table 21.

On the other hand, if it is determined in step S13 that a control packet is normally received in the link connection confirmation period LCT or it is determined in step S18 that the number of times that the radio link was maintained is not more than the reference number, the route maintenance means 203 of each of the radio devices 31 to 43 maintains the link and the information maintenance means 205 maintains information related to the maintained link (step S20). More specifically, the route maintenance means 203 of each of the radio devices 31 to 43 maintains the routing information of the link in the routing table 21 to maintain the link. As described above, in the stage in which the local link information is constructed according to the OLSR protocol, since the information maintenance means 205 of each of the radio devices 31 to 43 holds information related to adjacent radio devices (a set of adjacent radio devices) to each of the radio device 31 to 43, radio devices adjacent to the adjacent devices (a set of two-hop adjacent radio devices), the topology (arrangement state) of the radio devices 31 to 43 in the radio communication network 100 and an MPR selector set, the information maintenance means 205 maintains these kinds of information. According to the invention, the related information may include information related to at least one of the adjacent radio devices adjacent to the radio devices 31 to 43 (the set of adjacent devices), the radio devices adjacent to the adjacent devices (the set of two-hop adjacent radio devices), the topology (arrangement state) of the radio devices 31 to 43 in the radio communication network 100, and the MPR selector set.

After step S19 or step S20, the series of operation proceeds to step S3 in FIG. 19.

Note that the process in the flowchart in FIG. 19 and in the flowchart in FIG. 20 is repeated for each radio link. When step S1 in FIG. 19 is carried out for the second time and on, the route maintenance means 203 of each of the radio devices 31 to 43 determines in step S1 whether a control packet is received for the first time after the end of a link connection confirmation period LCT.

In the flowchart shown in FIG. 20 described above, in the route from "YES" in step S14 via step S15, "YES" in step S16, and "YES" in step S18 to step S20, if the control packet is not received from a radio device that has transmitted the control packet, the radio link with the radio device that has transmitted the control packet is maintained, provided that a frame (data packet) other than the control packet is received from the radio device that has transmitted the control packet, and that the radio communication quality of the frame (data packet) satisfies the standard quality requirement. More specifically, even if the control packet is not received, the route recovers the radio link used for stable radio communication.

In the flowchart shown in FIG. 20, the route from "NO" in step S14 through "YES" in step S17 and "YES" in step S18 to step S20, or the route from "YES" in step S14 through step S15, "NO" in step S16, "YES" in step S17 and "YES" in step S18 to step S20 is a route that recovers a radio link that is not used for radio communication.

In this way, according to the invention, even if no control packet is received, a radio link used for radio communication or a radio link not used for radio communication is recovered under certain conditions.

Therefore, according to the invention, radio links can be prevented from being disconnected, and therefore routes can be kept from being switched because of such radio link disconnection. Once a radio link is disconnected, adjacent information related to the disconnected radio link and topology information are invalidated, and it would usually take time to reconstruct the radio link. According to the invention, however, since such radio link disconnection can be suppressed, so that the ratio of occurrence of reconstruction of radio links can be lowered, and stable radio communication can be carried out.

Since the related information (adjacent information, topology information and the like) of a maintained radio link is maintained (see step S20), and therefore if the once maintained link is disconnected thereafter, the related information for reconstructing the radio link is maintained, so that the radio link can be reconstructed in a shorter period of time than the conventional case.

Furthermore, since an unused radio link is recovered (see "YES" in step S17), a radio link can be prevented from being disconnected because of the presence of a hidden terminal that inhibits a control packet from being normally received.

The link would be maintained in the route from "YES" in step S14 through step S15, "NO" in step S16, "YES" in step S17, and "YES" in step S18 to step S20 in FIG. 20. For example, when the radio device 36 receives a frame (data packet) from the radio device 37 within the link connection confirmation period LCT (see "YES" in step S14), and the difference δRSSI is outside the threshold range (see "NO" in step S16), the radio link 36-37 in FIG. 13 is maintained. In this way, the radio device 36 receives a frame (data packet), while if the radio communication quality is low at the time of receiving the frame (data packet)(if the difference ΔRSSI is outside the threshold range), the radio link 36-37 is determined to be an unused radio link and recovered. Therefore, according to the invention, an unused link refers to a radio link disconnected or a radio link maintained but with low radio communication quality.

It is determined in step S18 whether the number of times that the radio link was maintained is not more than the reference number in order to detect a radio link that should be disconnected among the maintained radio links or to detect a truly disconnected radio link.

More specifically, since it is determined in step S16 whether ΔRSSI is within the threshold range after it is determined in step S14 that a frame has been received within the link connection confirmation period LCT, when the number of times that the radio link was maintained is not limited, the radio link can be maintained over and over again as long as a frame continues to be received within the link connection confirmation period LCT. Then, a radio link with a radio device that has stopped the OLSR operation continues to be maintained. Therefore, in order to prevent this situation, a limit is provided for the number of times that the radio link was maintained.

It is determined in step S17 that an unused radio link is recovered if any packet PKT such as a control packet and a data packet is not actually received as long as a prescribed amount of radio communication is normally transmitted/received within the link connection confirmation period LCT, and therefore, with no limit for the number of times that the radio link was maintained, a radio link actually disconnected is maintained. This causes such an actually disconnected radio link to be recovered, and therefore in order to prevent this and detect a truly disconnected radio link, a limit for the number of times that the radio link was maintained is provided.

The reference number is for example set to the average number of packet losses generated in a prescribed period in the radio communication network 100. If the number of times that a radio link is maintained exceeds the average number of packet losses generated in the prescribed period, it is determined that the reason why a control packet does not arrive at the destination in the radio link is not because of packet loss but because the radio link is actually disconnected. Therefore, the route maintenance means 203 is capable of counting the average number of packet losses generated in the prescribed period, and determines whether the number of times that the radio link was maintained is not more than the reference number using the average number of the counted packet losses as a reference number.

Note that the reference number in step S18 may include a reference number 1 (the reference number when a radio link should be disconnected) when the process proceeds via "YES" in step S16 to step S18 and a reference number 2 (the reference number used to detect a truly disconnected radio link) when the process proceeds via "YES" in step S17 to step S18. The reference number 1 may be equal to or different from the reference number 2.

Examinations carried out to prove the effect of maintaining a radio link in response to reception of data packets even without receiving control packets will be described. As a comparative example, a conventional protocol that maintained a radio link based only on reception of control packets was used.

In the examinations, a radio protocol according to IEEE802.11b was used, and the radio transmission rate was fixed to 11 Mbps. The control packet was broadcast at intervals of 5 seconds and the topology information was broadcast at intervals of 15 seconds. As for the arrangement of radio devices, five radio devices are each positioned on both sides of one relay node (relay radio device) interposed therebetween. The radio devices on both ends were positioned so as to be able to communicate only through the relay radio device and unable to communicate directly. As a data packet, a flow (UDP payload 372 bytes, at intervals of 50 msec) corresponding to one session of VoIP (Voice over Internet Protocol) specified by G711 between the radio devices at both ends was transmitted/received. This was increased to five sessions and the inventive method and the conventional method were compared regarding the packet error ratio, the number of radio link disconnections and the error ratio of control packets.

Table 1 shows the number of times the radio link was disconnected in the case of five sessions, the maximum value for the data packet error ratio and the average value measured for ten measurement values of data packet error ratios.

TABLE 1

|  | inventive method | conventional method |
| --- | --- | --- |
| average link disconnection (number of times) | 0 | 3.5 |
| maximum packet error ratio (%) | 17.35 | 75.05 |
| average packet error ratio (%) | 1.412 | 5.861 |

The packet error ratio and the number of radio link disconnections increase as the number of sessions increases. The number of radio link disconnections in the case of five sessions was "zero" for the inventive method and "3.5 times" for the conventional method. Therefore, the radio link was maintained without disconnection by the inventive method.

The maximum data packet error ratio was 75.05% for the conventional method, while the maximum ratio was reduced to 17.35% for the inventive method.

Therefore, it was confirmed that the data packet error ratio could be kept low by maintaining the radio link in response to success in transmission/reception of a data packet when a control packet was not received.

Note that in the above description, it is determined in step S16 as shown in FIG. 20 whether the difference ΔRSSI between the reception signal intensity RSSIn at the time of receiving a frame (data packet) and the reception signal intensity RSSIn-1 of the most recently received packet is within the threshold range. However, according to the invention, the determination may be based on the signal to noise ratio (SNR) in consideration of the noise level or it may be determined whether the reception signal RSSIn is not less than the threshold WIth for detecting an intensity equal to or more than the minimum intensity of a radio wave transmitted/received in a stable radio wave environment.

When it is determined in step S16 whether the reception signal RSSIn is not less than the threshold WIth for detecting an intensity equal to or more than the minimum intensity of a radio wave transmitted/received in a stable radio environment, the threshold WIth is detected by the following method. The radio device 36 shown in FIG. 1 periodically receives a control packet from the radio devices 32, 35, 37, 38, and 39, and therefore receives a plurality of control packets from each of the radio devices 32, 35, 37, 38, and 39. The signal strength detection means 202 of the radio device 36 detects a pair of a maximum value and a minimum value MAX[k] and MIN[k] (k: an integer that satisfies. $1 \leq k \leq m$, where m is the number of radio devices existing around the radio device 36) based on the plurality of reception signal intensities at the times of receiving a plurality of control packets from the radio device 32. The signal strength detection means 202 of the radio device 36 similarly detects a pair of a maximum value and a minimum value based on the plurality of reception signal intensities of the plurality of control packets received from each of the radio devices 35, 37, 38, and 39. Consequently, the signal strength detection means 202 of the radio device 36 detects m pairs of maximum values and minimum values MAX[1] and MIN[1] to MAX[m] and MIN[m].

Then, the route maintenance means 203 of the radio device 36 receives the m sets of maximum values and minimum values MAX[1] and MIN[1] to MAX[m] and MIN[m] from the signal strength detection means 202, rearranges the received m sets of maximum values and minimum values MAX[1] and MIN[L] to MAX[m] and MIN[m] so that the m maximum values MAX[1] to MAX[m] are in the descending order or ascending order, and produces m sets of maximum values and minimum values D_MAX[1] and D_MIN[1] to D_MAX[m] and D_MIN[m].

The route maintenance means 203 of the radio device 36 produces a graph in which the m sets of maximum values and minimum values D_MAX[1] and D_MIN[1] to D_MAX[m] and D_MIN[m] are plotted relative to the number of radio devices.

In this way, the route maintenance means 203 of the radio device 36 detects two maximum values D_MAX[i] and D_MAX[i+1] when the difference between two adjacent maximum values D_MAX[j] and D_MAX[j+1] is maximized and detects the minimum values D_MIN[i] and D_MIN[i+1] corresponding to the detected two maximum values D_MAX[i] and D_MAX[i+1]. The route maintenance means 203 of the radio device 36 detects the average= [(D_MIN[i]+D_MIN[i+1])/2] of the two minimum values D_MIN[i] and D_MIN[i+1] as the threshold WIth.

The detected threshold WIth is a threshold used to detect an intensity equal to or more than the minimum intensity of radio waves transmitted/received in a stable radio environment, and therefore if the reception signal intensity RSSIn at the time of receiving a frame (data packet) is not less than the threshold WIth, the frame (data packet) is received in a stable radio environment. Therefore, the route maintenance means 203 can determine in step S16 whether a frame (data packet) has been received by stable radio communication by determining whether the reception signal intensity RSSIn is not less than the threshold WIth.

In the above description, a link connection confirmation period LCT starts in response to normal transmission or reception of a control packet, but according to the invention, the link connection confirmation period LCT may be started in response to normal transmission or reception of any packet PKT such as an RTS packet, a CTS packet, an ACK packet, and a management frame (beacon, probe) other than the control packet.

Furthermore, in the above description, an advertisement indicating that a maintained radio link is to be recovered is included in the dedicated packet PKT_D, the invention is not limited to this arrangement and an extended control packet provided with a region storing the advertisement may be produced. Therefore, the "dedicated packet" according to the invention is the above-described dedicated packet PKT_D or the extended control packet.

In the above description, a radio link is recovered when radio communication is carried out by a table driven type routing protocol, but the invention is not limited to this and a radio link may be recovered by the above-described method when radio communication is carried out using an on-demand type routing protocol such as AODV.

In the above description, routing is carried out in the layer 3, i.e., the Internet layer, while according to the invention, a radio link may be recovered by the above-described method when routing is carried out in a layer other than the Internet layer.

According to the invention, the link connection confirmation period LCT forms a "route confirmation period."

Furthermore, according to the invention, in step S5 in FIG. 19, the communication means 204 that searches for a new route by referring to the routing table 21 forms a "route determining means (unit)."

It is to be understood that the embodiments disclosed herein are illustrative and not restrictive. The scope of the invention is defined by the appended claims rather than by the description preceding them, and all modifications that fall within the scope of claims and equivalence thereof are intended to be embraced by the claims.

What is claimed is:

1. A radio device for use in an autonomously established radio communication network and carrying out radio communication based on a table-driven protocol, comprising:
   a period setting unit setting a route confirmation period used to confirm a first radio link between the radio device and a first adjacent radio device adjacent to the radio device;
   a communication unit carrying out radio communication with a plurality of radio devices adjacent to the radio device, and regularly transmitting control packets within the route confirmation period to maintain said first radio link;
   a route maintenance unit maintaining said first radio link when said communication unit receives a packet from said first adjacent radio device in said route confirmation period, even if said communication unit does not or receive a control packet used to maintain said first radio link from said first adjacent radio device in said route confirmation period; and
   wherein when there is a second radio link, different from said first radio link, between the radio device and a second adjacent radio device, and at least a predetermined minimum amount of radio communication is carried out using the second radio link, said route maintenance unit maintains the first radio link even if no packet is received through said first radio link in said route confirmation period.

2. The radio device according to claim 1, wherein said route maintenance unit maintains said first radio link when a difference ΔRSSI, between a reception signal intensity of a previously received packet and a reception signal intensity of a presently received packet, is within a predetermined range.

3. The radio device according to claim 1, wherein said route maintenance unit maintains said first radio link when a channel used in said second radio link and a channel used in said first radio link affect each other's radio communication qualities.

4. The radio device according to claim 1, wherein said route maintenance unit determines the degree of effects on the radio communication qualities based on the positional relation between the adjacent radio device corresponding to said second radio link and the adjacent radio device corresponding said first radio link and maintains said first radio link when there is mutual effect.

5. The radio device according to claim 1, wherein said route maintenance unit maintains said first radio link when the number of times that said first radio link was maintained is at most a reference number and disconnects said first radio link when said number of times exceeds said reference number.

6. The radio device according to claim 1, further comprising an information maintenance unit maintaining information related to said maintained first radio link when said first radio link is maintained.

7. The radio device according to claim 6, wherein said related information includes at least one kind of information related to said first adjacent radio device, information related to a radio device adjacent to said first adjacent radio device, and information related to the arrangement state of radio devices in said radio communication network.

8. The radio device according to claim 1, wherein when said first radio link is maintained, said communication unit transmits to said first adjacent radio device a dedicated packet including an advertisement that indicates that the maintained first radio link is to be recovered.

9. The radio device according to claim 8, wherein said communication unit carries out radio communication with a second adjacent radio device from which it has received a dedicated packet, the dedicated packet including an advertisement that indicates that a maintained radio link with the second adjacent radio is to be recovered, with reduced amount of radio communication.

10. The radio device according to claim 1, further comprising a route determining unit determining a route, used to transmit a packet to a destination, via a radio device different from the radio device that has transmitted a dedicated packet, when said communication unit receives the dedicated packet including an advertisement that displays that said maintained radio link is to be recovered.

11. A radio communication network, comprising the radio device according to claim 1.

* * * * *

UNITED STATES PATENT AND TRADEMARK OFFICE
CERTIFICATE OF CORRECTION

| | | |
|---|---|---|
| PATENT NO. | : 7,890,112 B2 | |
| APPLICATION NO. | : 11/896531 | |
| DATED | : February 15, 2011 | |
| INVENTOR(S) | : Tetsuya Ito et al. | |

It is certified that error appears in the above-identified patent and that said Letters Patent is hereby corrected as shown below:

Specifically, in Claim 1, Column 23, line 54 it currently reads...

-- period, even if said communication unit does not or but it should read

--period, even if said communication unit does not

Signed and Sealed this
Seventh Day of February, 2012

David J. Kappos
*Director of the United States Patent and Trademark Office*